(12) United States Patent
Qureshi-Arya

(10) Patent No.: US 12,195,252 B2
(45) Date of Patent: Jan. 14, 2025

(54) HANDLING SYSTEMS, CONTAINERS FOR FOOD AND BEVERAGE, AND CARRIERS

(71) Applicant: CUPCLUB LIMITED, London (GB)

(72) Inventor: Safia Qureshi-Arya, Surrey (GB)

(73) Assignee: CUPCLUB LIMITED (GB)

( * ) Notice: Subject to any disclaimer, the term of this patent is extended or adjusted under 35 U.S.C. 154(b) by 193 days.

(21) Appl. No.: 16/652,939

(22) PCT Filed: Oct. 4, 2018

(86) PCT No.: PCT/GB2018/052835
§ 371 (c)(1),
(2) Date: Apr. 1, 2020

(87) PCT Pub. No.: WO2019/069082
PCT Pub. Date: Apr. 11, 2019

(65) Prior Publication Data
US 2020/0262624 A1    Aug. 20, 2020

(30) Foreign Application Priority Data

Oct. 4, 2017  (GB) ........................... 1716228

(51) Int. Cl.
*G06K 19/07* (2006.01)
*B65D 1/24* (2006.01)
(Continued)

(52) U.S. Cl.
CPC ........... *B65D 51/245* (2013.01); *B65D 1/243* (2013.01); *B65D 25/205* (2013.01);
(Continued)

(58) Field of Classification Search
CPC ................ A47G 19/2227; B65D 1/243; B65D 2203/10; B65D 25/205; B65D 51/245;
(Continued)

(56) References Cited

U.S. PATENT DOCUMENTS

| | | | |
|---|---|---|---|
| 9,334,150 B1* | 5/2016 | Ost ...................... | B67D 1/1236 |
| 2006/0218014 A1* | 9/2006 | Walker .................. | A61J 7/0481 |
| | | | 705/3 |

(Continued)

FOREIGN PATENT DOCUMENTS

| | | |
|---|---|---|
| DE | 202011106743 U1 | 3/2012 |
| EP | 2604538 B1 | 6/2013 |

(Continued)

OTHER PUBLICATIONS

Validfill: "ValidFill Coffee and Kiosk Demonstration", YouTube; Jun. 7, 2015; https://www.youtube.com/watch?v=ZKOhJVdcsxl; Retrieved from internet [retrieived on Jan. 4, 2021.

*Primary Examiner* — Omer S Khan
(74) *Attorney, Agent, or Firm* — Thorpe North & Western, LLP.

(57) ABSTRACT

A handling system suitable for interaction with both a plurality of containers suitable for carrying hot and cold beverages and a plurality of carriers suitable for carrying a plurality of containers; said plurality of containers comprising a base; a walled portion upwardly extending from said base; and a lid for attachment to said walled portion; said plurality of carriers comprising at least one compartment for receiving lids and at least a second compartment for receiving containers; wherein both said carriers and said containers comprise a remotely interrogatable tag for respectively identifying said carrier and said container; wherein said system further comprises a remote processing module; and a plurality of points of interaction with said remotely interrogatable tags which provide one or more of the following factors: a date and time stamp of an interaction, an identification of the point, an identification of an individual interacting with the system and an identification of the container or carrier which interacts with said system; and a communication link for dispatching signals representative of said factors to said remote processing module.

19 Claims, 22 Drawing Sheets

(51) Int. Cl.
*B65D 25/20* (2006.01)
*B65D 51/24* (2006.01)
*B65D 71/52* (2006.01)
*G06K 19/077* (2006.01)
*A47G 19/22* (2006.01)

(52) U.S. Cl.
CPC ..... *B65D 71/0003* (2013.01); *G06K 19/0723* (2013.01); *G06K 19/07758* (2013.01); *A47G 19/2227* (2013.01); *B65D 2203/10* (2013.01)

(58) Field of Classification Search
CPC ............... B65D 71/0003; G06K 19/07; G06K 19/0723; G06K 19/07758; G06Q 10/30; Y02W 90/00
See application file for complete search history.

(56) References Cited

U.S. PATENT DOCUMENTS

| | | | |
|---|---|---|---|
| 2006/0280035 A1* | 12/2006 | Walker | H04L 9/3226 368/10 |
| 2007/0008136 A1* | 1/2007 | Suzuki | G07G 1/0054 340/572.1 |
| 2008/0110774 A1* | 5/2008 | Chisholm | B65D 1/0276 220/660 |
| 2010/0219252 A1* | 9/2010 | Kikuchi | G06K 19/0723 235/488 |
| 2011/0064549 A1* | 3/2011 | Carpinelli | A47L 15/501 414/405 |
| 2011/0114647 A1 | 5/2011 | Halliberg | |
| 2011/0297567 A1* | 12/2011 | Maness | A61B 50/362 206/370 |
| 2013/0169409 A1 | 7/2013 | Chang et al. | |
| 2013/0233353 A1* | 9/2013 | Vacca | A47L 15/501 134/25.2 |
| 2014/0021207 A1 | 1/2014 | Noble, Jr. et al. | |
| 2014/0312035 A1* | 10/2014 | McGuigan | B65F 1/1607 220/23.83 |

FOREIGN PATENT DOCUMENTS

| | | |
|---|---|---|
| EP | 3210502 A1 | 8/2017 |
| KR | 200221798 Y1 * | 4/2001 |
| NL | 1013772 | 12/1999 |
| WO | 0100493 A1 | 1/2001 |
| WO | 2007097385 A1 | 8/2007 |

* cited by examiner

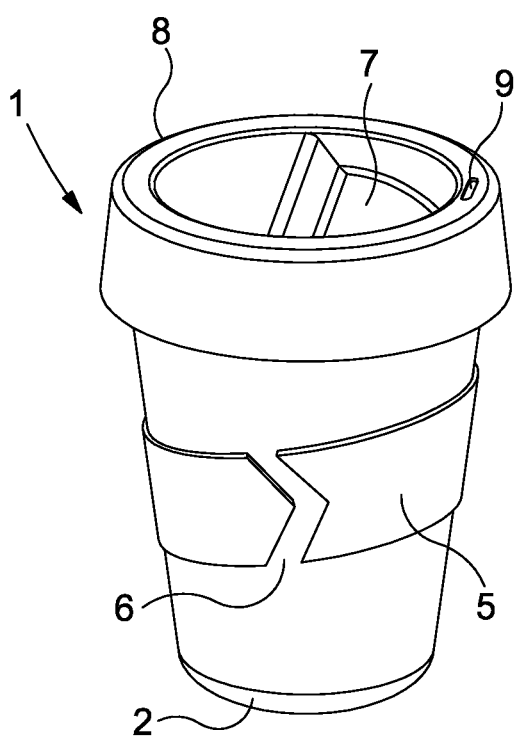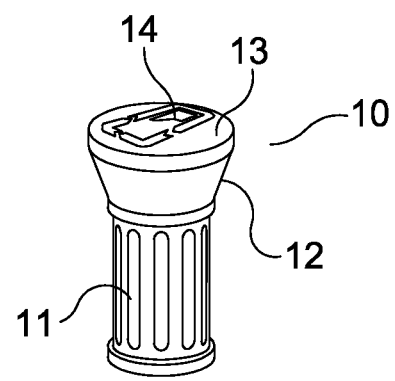
FIG. 2A
FIG. 2B

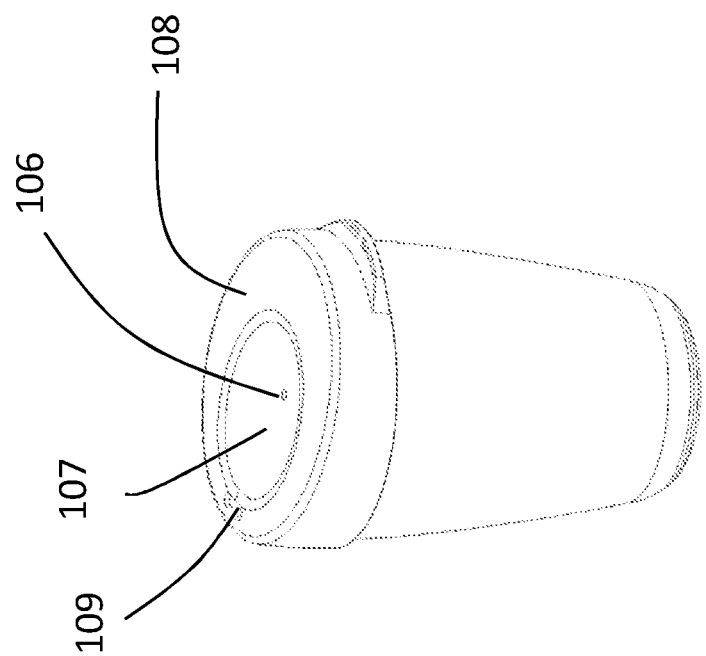
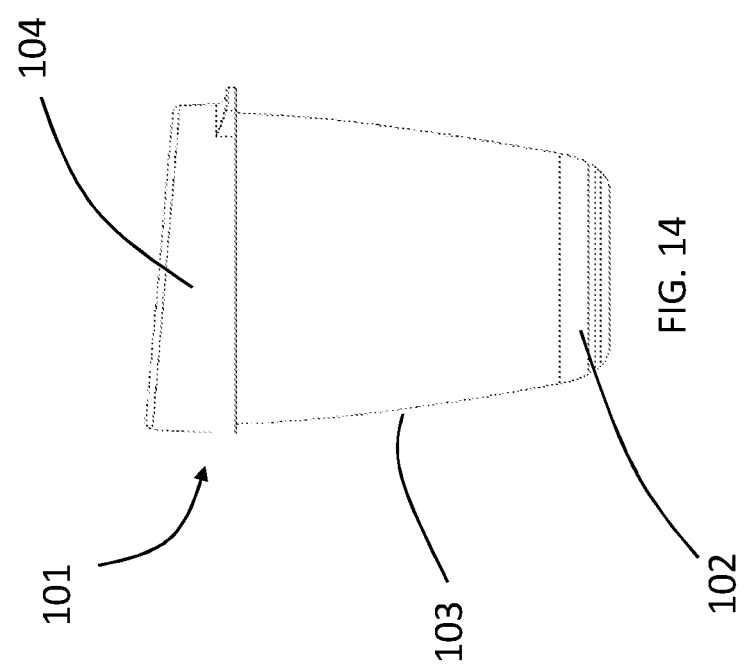

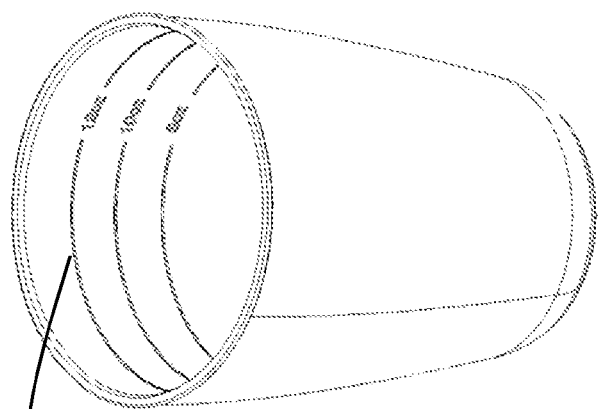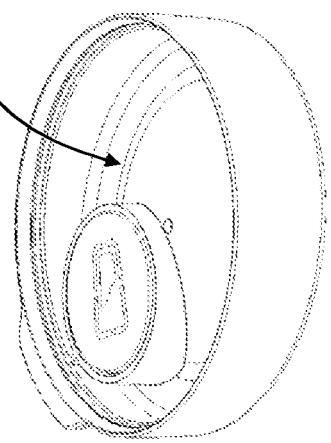
FIG. 19
FIG. 20

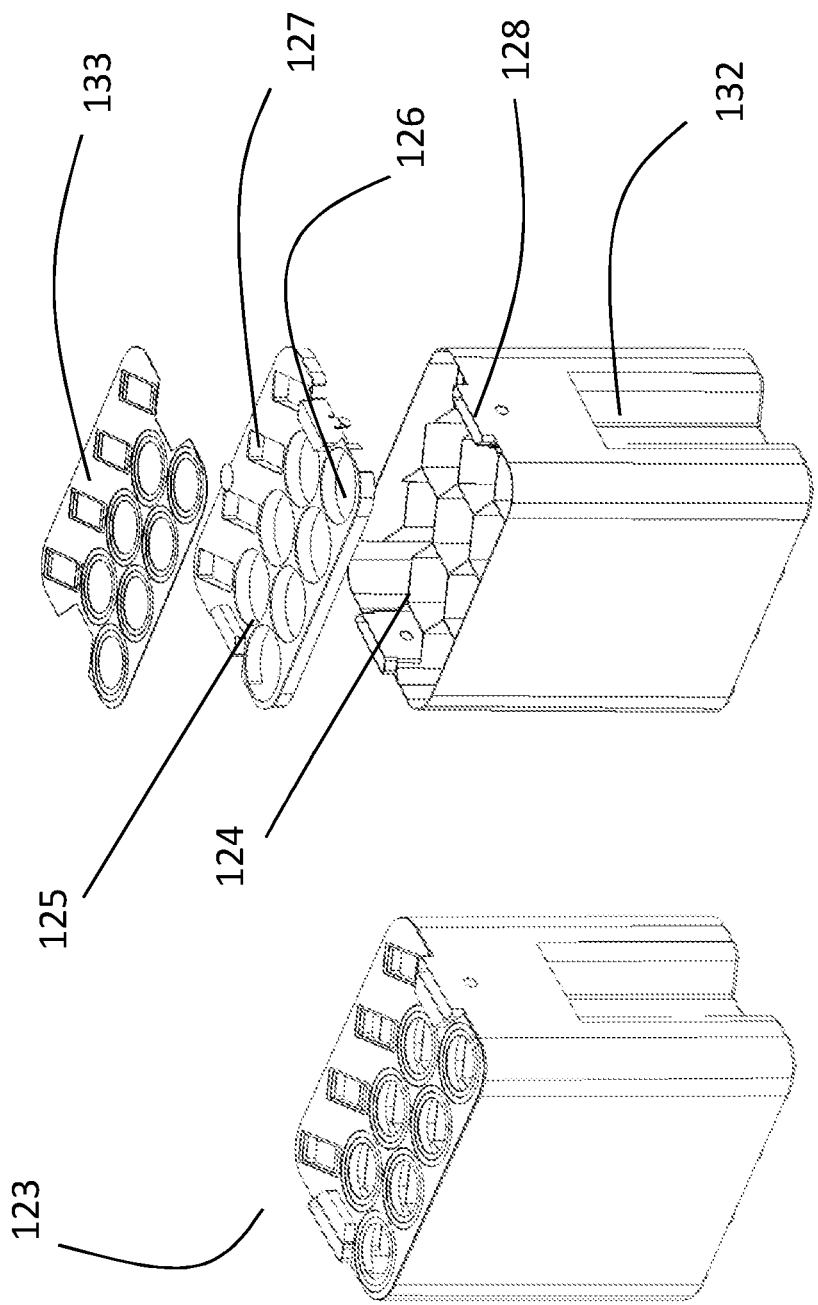

HANDLING SYSTEMS, CONTAINERS FOR FOOD AND BEVERAGE, AND CARRIERS

FIELD OF THE INVENTION

The invention relates to handling systems, Containers for food and beverage, and carriers. Optionally, the invention relates to cups.

BACKGROUND TO THE INVENTION

The modern lifestyle appears to require an ever-growing consumption of hot or cold beverages. A dense network of suppliers exists providing a one-off solution in the form of disposable single-use cups or single-use food and beverage packaging primarily for takeaway. In order to withstand the often very hot beverage contained in these disposable cups or containers, these are typically made at least in part of non-biodegradable plastics which have negative environmental impacts as they go to landfill and sometimes clog up our environment requiring extensive energy consuming waste collection programmes. Whilst compostable containers also exist these require separation and industrial composting. These negative environmental impacts are even worse when considering the extensive energy requirement in producing large volumes of single use packaging solutions.

One of the aspects of this invention is to seek to deal with the complexities arising from the almost infinite end destinations of takeaway cups or other such food and beverage containers and provide a system which can improve collection and reuse of cups or other such containers.

One of the approaches concerns the cup or container itself. There are literally thousands of prior packaging proposals dealing with hot beverage cups.

One aspect of the invention seeks to introduce a reversal of conventional thinking in this field and then propose how improved containers may be advantageously integrated in handling systems with minimal environmental damage arising from their use and reuse.

SUMMARY OF THE INVENTION

In a first broad independent aspect, the invention provides a handling system suitable for interaction with both a plurality of containers suitable for carrying hot beverages and a plurality of carriers suitable for carrying a plurality of containers; the plurality of containers comprising a base; a walled portion upwardly extending from the base; and a lid for attachment to the walled portion; the plurality of carriers comprising at least one compartment for receiving at least part of the containers;
wherein both the containers and the carriers comprise a remotely interrogatable tag for respectively identifying the container and the carrier;
wherein the system further comprises a remote processing module; and a plurality of points of interaction with the remotely interrogatable tags; the points of interaction providing one or more of the following factors: a date and time stamp of an interaction, an identification of the point, an identification of an individual interacting with the system and an identification of the container or carrier which interacts with the system; and a communication link for dispatching signals representative of the factors to the remote processing module.

Whilst containers may be suitable for both hot and cold beverages. The temperature level of a hot beverage may be greater than 70 degrees Celsius. Preferably, the temperature level of a hot beverage may be greater than 80 degrees Celsius.

In a subsidiary aspect, the points of interaction comprise one or more scanners for scanning the remotely interrogatable tag.

In a further subsidiary aspect, the container comprises one or more remotely interrogatable tags integrated with one or more of the base, the upwardly extending walled portion, and/or the lid.

In a further subsidiary aspect, the container comprises a tag located within its base.

In a further subsidiary aspect, the container further comprises a remotely interrogatable tag integrated within its lid.

In a further subsidiary aspect, the interrogatable tag is embedded within the moulded plastics of either the container or the carrier.

In a further subsidiary aspect, the lid has an outer surface and an inner surface; said inner surface comprising a recessed portion for securing the remotely interrogatable tag to the lid.

In a further subsidiary aspect, the container comprises an annular band which extends at least partly around the upwardly extending walled portion and protrudes therefrom.

In a further subsidiary aspect, the lid incorporates a rim with an aperture through which beverage may, in use, exit the container and a part-spherical recessed portion located within the rim; a through hole being located in the part-spherical recessed portion.

In a further subsidiary aspect, the carrier comprises a remotely interrogatable tag for identifying the carrier; and at least one compartment for receiving lids and at least a second compartment for receiving containers; the second compartment being segregated from the first compartment and having upwardly extending walls for facilitating the stacking of the containers in a closely contiguous configuration.

In a further subsidiary aspect, the carrier comprises at least one parallelepipedal case.

In a further subsidiary aspect, the carrier comprises a plurality of stacked parallelepipedal cases.

In a further subsidiary aspect, the carrier comprises one or more beams which act as a junction member between adjacent stacked cases.

In a further subsidiary aspect, the carrier comprises a lid with at least two kinds of apertures; a first kind of aperture being sized and shaped to allow the insertion of a container and a second kind of aperture being sized and shaped to allow the insertion of a lid and prevent the insertion of a container.

In a further subsidiary aspect, the first aperture is substantially circular and comprises one or more projections projecting radially inwards.

In a further subsidiary aspect, the first aperture comprises diametrically oppositely disposed projections.

In a further subsidiary aspect, at least one of the interaction points collates one or more of the following additional factors: the location of the point of sale, the time of sale, the kind of beverage/food, and the quantity of beverage/food.

In a further subsidiary aspect, the remote processing module aggregates the data to determine a profile for one or more of the following: an individual, a container, and a point of sale.

In a further subsidiary aspect, the system further comprises a location of a carrier; and a module for calculating the distance between a point of an initial interaction with the container and a location of a carrier.

In a further broad aspect, the invention provides a cup suitable for carrying hot beverages comprising a base; a walled portion upwardly extending from the base; and a lid for attachment to the walled portion; wherein the cup comprises one or more remotely interrogatable tags integrated with one or more of the base, the upwardly extending walled portion, and/or the lid.

In a subsidiary aspect, the cup comprises a tag located within its base.

In a further subsidiary aspect, the cup comprises a further remotely interrogatable tag integrated within its lid.

In a further subsidiary aspect, the tag comprises a disc which is embedded into the moulded plastics material of the cup.

In a further subsidiary aspect, the further tag is embedded into the moulded plastics material of the lid.

In a further subsidiary aspect, the cup comprises an annular band which extends at least partly around the upwardly extending walled portion and protrudes therefrom.

In a further subsidiary aspect, the lid incorporates a rim with an aperture through which beverage may, in use, exit the cup and a part-spherical recessed portion located within the rim; a through hole being located in the part-spherical recessed portion.

In a further subsidiary aspect, the invention provides a carrier suitable for carrying a plurality of cups in accordance with any of the preceding aspects, wherein the carrier comprises a remotely interrogatable tag for identifying the carrier; and at least one compartment for receiving lids and at least a second compartment for receiving cups; the second compartment being segregated from the first compartment and having upwardly extending walls for facilitating the stacking of the cups in a closely contiguous configuration.

In a further subsidiary aspect, the carrier comprises at least one parallelepipedal case.

In a further subsidiary aspect, the carrier comprises a plurality of stacked parallelepipedal cases.

In a further subsidiary aspect, the carrier comprises one or more beams which act as a junction member between adjacent stacked cases.

In a further subsidiary aspect, the carrier comprises a lid with at least two kinds of apertures; a first kind of aperture being sized and shaped to allow the insertion of a cup and a second kind of aperture being sized and shaped to allow the insertion of a lid and prevent the insertion of a cup.

In a further subsidiary aspect, the first aperture is substantially circular and comprises one or more projections projecting radially inwards.

In a further subsidiary aspect, the first aperture comprises diametrically oppositely disposed projections.

In a further broad independent aspect, the invention provides a cup suitable for carrying hot beverages comprising a base; a walled portion upwardly extending from the base and a lid for attachment to the walled portion; wherein the cup comprises one or more remotely interrogatable tag integrated within one or more of the base, the upwardly extending walled portion, and/or the lid. This configuration is particularly advantageous because it allows minimal change to the configuration of a cup whilst allowing it to integrate with a remote processing module which can reduce the complexity inherent in the distribution of takeaway cups. It also allows for a particularly robust structure which avoids the one-shot use of the prior art as the cup may be used for many cycles. In certain preferred embodiment, the cup and any other washable products detailed in this application have been optimised for commercial scale washing, including the cup, lid and drop point cases. In certain embodiment, the cup and lid allow optimal washing and quick drying on an industrial scale. Optionally, any crevices are absent in the lid and the cup where water may otherwise sit or gather during the washing cycle.

In a subsidiary aspect, the tag is located within the base. This provides an advantageous structure because it allows in certain embodiments for improved communication with a point of sale interface as it may facilitate improved reading of the tag as the cup is rested against a touch pad at a point of sale. It also provides greater stability for the cup due to its increased density.

In a subsidiary aspect a further remotely interrogatable tag is integrated within the lid. This allows the benefits outlined with respect to the cup portion to apply to an even more complex structure formed in certain embodiments of two separable components.

In certain embodiments when the tag is in the lid, it also particularly advantageous because it is convenient for consumers to scan with their smart phone device or other personal digital assistant. In certain embodiments, it allows the scanning of the lid which facilitates media interaction with the consumer in the form of media files selected from the group comprising one or more of the following: image, text, animation or music.

In a subsidiary aspect, the tag comprises a disc which is welded to the cup; and the cup comprises a recessed portion for receiving the disc and for retaining therein the disc; whereby the disc may be secured to the cup. This improves the attachment of the disc to the cup which is particularly advantageous for high cycles of use and reuse.

In a subsidiary aspect, the lid has an outer surface and an inner surface which comprises a recessed portion for securing the further remotely interrogatable tag to the lid.

In a subsidiary aspect, the tag comprises a disc with a threaded perimeter, and the cup comprises a recessed portion with a correspondingly threaded diameter; whereby the disc may be releasably secured to the cup. This provide advantageous protection of the readable tag to withstand tampering whilst at the same time allowing the tag to be retrofitted into a re-usable cup.

In a subsidiary aspect, the disc comprises an outer surface with a recessed portion suitable for receiving a correspondingly shaped driver for driving the rotation of the disc when securing the disc to a cup. This configuration is particularly advantageous for further resisting tampering and to better selectively allow the disc to be released from the cup if appropriate.

In a further subsidiary aspect, the lid has an outer surface and an inner surface which comprises a recessed portion for releasably securing the further remotely interrogatable tag to the lid. In this configuration, the tag is advantageously further shielded from any tampering as it is not accessible from the outside of a cup with its lid is secured following its purchase.

In a further subsidiary aspect, the cup comprises an annular band which extends at least partly around the upwardly extending walled portion and protrudes therefrom. This configuration is particularly advantageous in terms of reducing the thermal conduction to a carrier of the cup.

In a further subsidiary aspect, the lid incorporates a rim with an aperture through which beverage, in use, may exit the cup and a part-spherical recessed portion located within the rim; a through hole being located in the part-spherical recessed portion. This configuration is particularly robust and increases the resilience of the lid of the cup for advantageous attachment to the walled portion of the cup. This is also advantageous as it allows drainage after or as part of the cleaning process which the lid would undergo prior to reuse.

In a further broad aspect, the invention provides a carrier suitable for carrying a plurality of cups in accordance with the preceding aspects, wherein the carrier comprises a remotely interrogatable tag for identifying a carrier; and at least one compartment for receiving lids and at least a second compartment for receiving cups; a second compartment being segregated from the first compartment and having upwardly extending walls for facilitating the stacking of the cup in a closely contiguous configuration. This configuration is particularly advantageous in order to prepare the disassembled cup and lid for recycling through a cleaning process in order to minimise handling of the cups. It also provides a particularly compact storage for maximum capacity for transportation.

In a subsidiary aspect, the carrier comprises at least one parallelepipedal case. This is advantageous in terms of stacking the carrier and in terms of increasing the quantity of transportable used cups and lids prior to cleaning.

In a further subsidiary aspect, the carrier comprises a plurality of stacked parallelepipedal cases. This further increases the capacity for transportation purposes.

In a further subsidiary aspect, the carrier comprises one more beams which act as a junction member between adjacent stacked cases. This further allows greater numbers of cups and lids to be transported and therefore improves the efficiency of the transportation of these.

In a further subsidiary aspect, the carrier comprises a lid with at least two kinds of apertures; a first kind of aperture being sized and shaped to allow the insertion of a cup and a second kind of aperture being sized and shaped to allow the insertion of a lid and prevent the insertion of a cup.

In a further subsidiary aspect, the first aperture is substantially circular but comprises one or more projections projecting radially inwards. This configuration is particularly advantageous as it renders very difficult the extraction of the cups and therefore prevents undue tampering with used cups.

In a further subsidiary aspect, the first aperture comprises diametrically oppositely disposed projections. This further improves the retention of the cups within the carrier.

In a further broad aspect, the invention provides a cup handling system comprising a plurality of cups in accordance with any one of the preceding aspects, a remote processing module and a plurality of remotely disposed interaction points which provide one or more of the following factors: a date and time stamp of an interaction with the interaction points, an identification of the point, an identification of an individual interacting with the system and an identification of the cup; and which dispatch signals representative of the factors to the remote processing module. This provides a solution for the complex repatriation of the cups taken away from various premises and allows these to be managed in order to minimise any waste going to landfill whilst the cups cycle through the system.

In a subsidiary aspect, at least one of the remotely disposed interaction points collates one or more of the following additional factors: location of the point of sale, the time of sale, the kind of beverage, and the quantity of beverage.

In a further subsidiary aspect, the remote processing module aggregates the data to determine a profile for one or more of the following: an individual, a cup, and a point of sale.

In a further subsidiary aspect, the cup handling system further comprises an interaction point for providing a date and time stamp of an interaction, and an identification of a carrier in accordance with any one of the preceding aspects. This further simplifies the handling of this otherwise highly complex and random process.

In a further subsidiary aspect, the cup handling system further comprises a location of a carrier; and a module for calculating the distance between a point of initial interaction with the cup and a location of the carrier.

In a further subsidiary aspect, the cup handling system further comprises a module for calculating the time of travel of the cup between points of interaction.

DETAILED DESCRIPTION OF THE FIGURES

FIG. 2 shows a perspective view of the embodiment of FIG. 1.

FIG. 14 shows a side elevation of a food/beverage container in accordance with a further embodiment.

FIG. 15 shows a perspective view of the container of FIG. 14.

FIG. 19 shows a perspective view of the container of FIG. 14 with its lid removed.

FIG. 20 shows a perspective view of the lid of the container of FIG. 14.

FIG. 25 shows a perspective view of the carrier.

FIG. 26 shows an exploded perspective view of the carrier.

Figure 28:
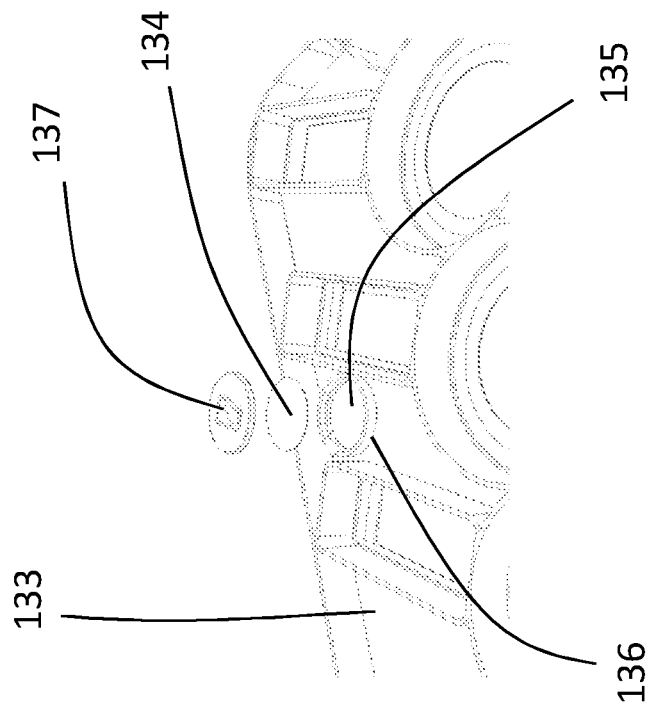
Figure 27:
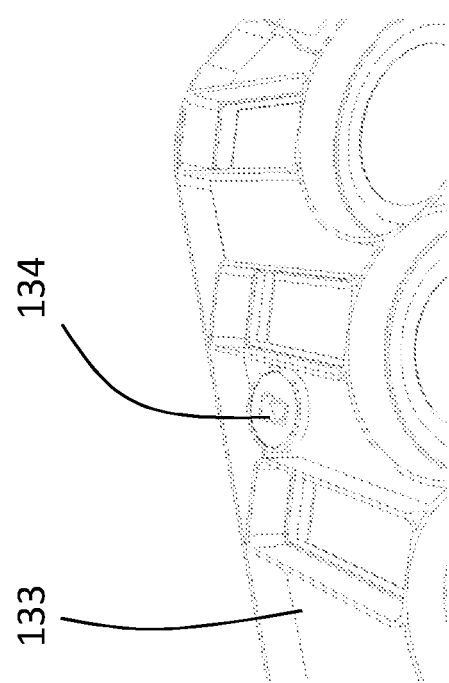
FIG. 27 shows a perspective view of part of the underside of the carrier lid or upper panel.

FIG. 28 also shows an exploded perspective view of part of the underside of the carrier lid or upper panel.

Figure 29:
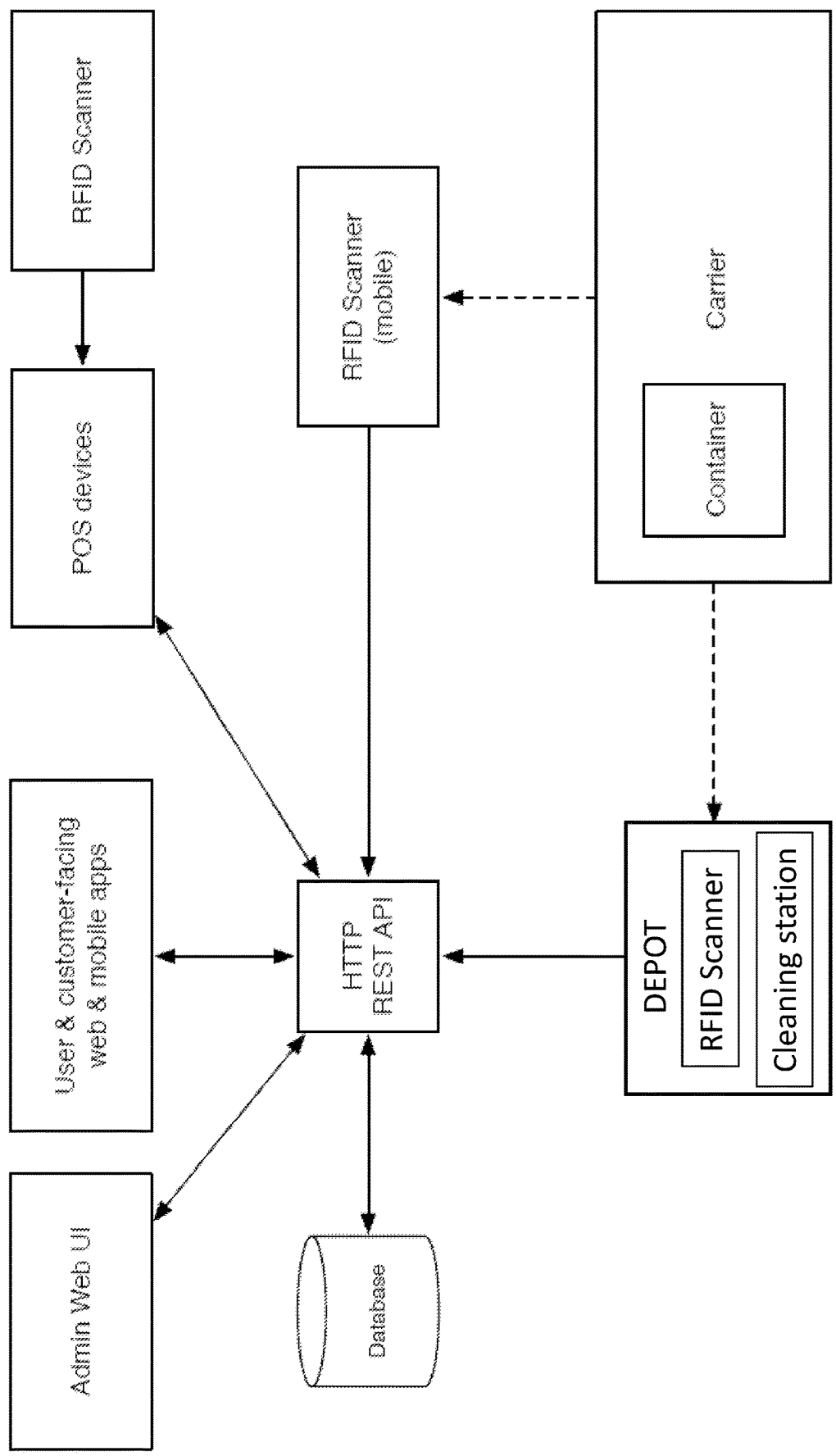

FIG. 29 shows a flow chart of an embodiment of the handling system.

DETAILED DESCRIPTION OF THE FIGURES

Figure 1:
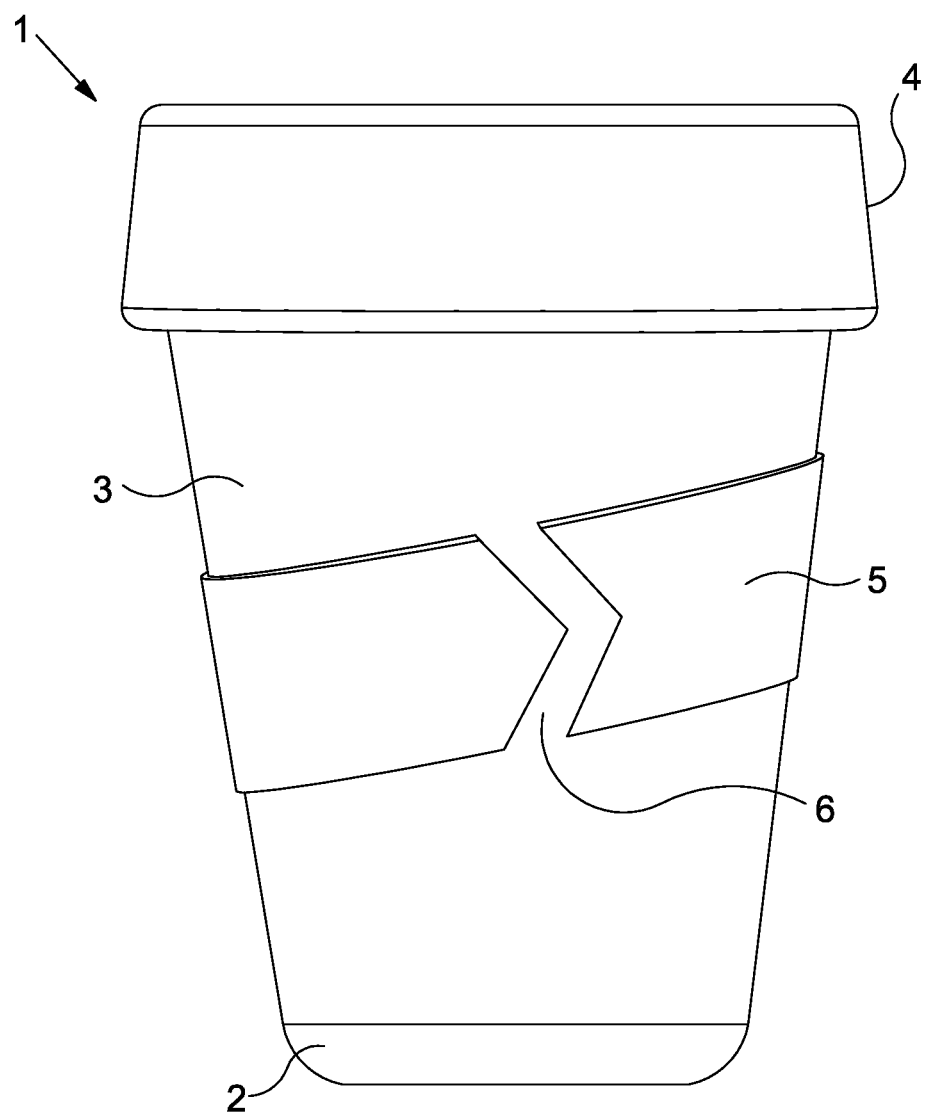
FIG. 1 shows a side elevation view of an embodiment of a cup.

FIG. 1 shows a cup generally referenced 1 suitable for carrying hot beverages. It comprises a base 2 and a walled portion 3 upwardly extending from the base. A lid 4 is attached to the upper most portion of the upwardly extending walled portion. In a preferred embodiment, an annular band 5 extends at least partly around the upwardly extending walled portion and protrudes there from. This band may be a separate component from the cup itself or may be integrally formed. In a preferred embodiment, the material of the band has a lower thermal conductivity than the wall of the cup itself. With reduced thermal conduction, the provision of the annular band allows for more comfortable handling of the cup. A gap 6 may be provided between two sections of the band.

In a preferred embodiment, the cup also has measure lines to denote 8 oz, 10 oz and 12 oz drink portions. In a further preferred embodiment, the cup may be suitable for containing 16 oz and may have a line denoting a 14 oz and/or a 16 oz portion.

Optionally, any of the embodiments considered may involve a surface of a component with a texture for reducing surface water retention so that little or no water droplets collect on the surface of cup and lid after washing.

FIG. 2A shows further detail of the lid where a crescent shaped recessed portion 7 is provided within a rim 8 which extends about the perimeter of the lid. Within the boundaries of the rim, an aperture which may be preferably of oblong shape is provided. Aperture 9 facilitates the flow of beverage out of the cup dependent upon the mode of use. The addition of a through hole made within the lid to facilitate the equalizing of the pressure within the cup during the drinking process.

FIG. 2B is a driver generally referenced 10 with a cylindrical stem 11 and a knurled outer surface to facilitate advantageous gripping of the driver. The driver has a widening head portion 12 with a front surface 13 comprising projections 14 which are sized and shaped to correspond with the recesses of disc 15 as shown in FIG. 3.

Figure 3:
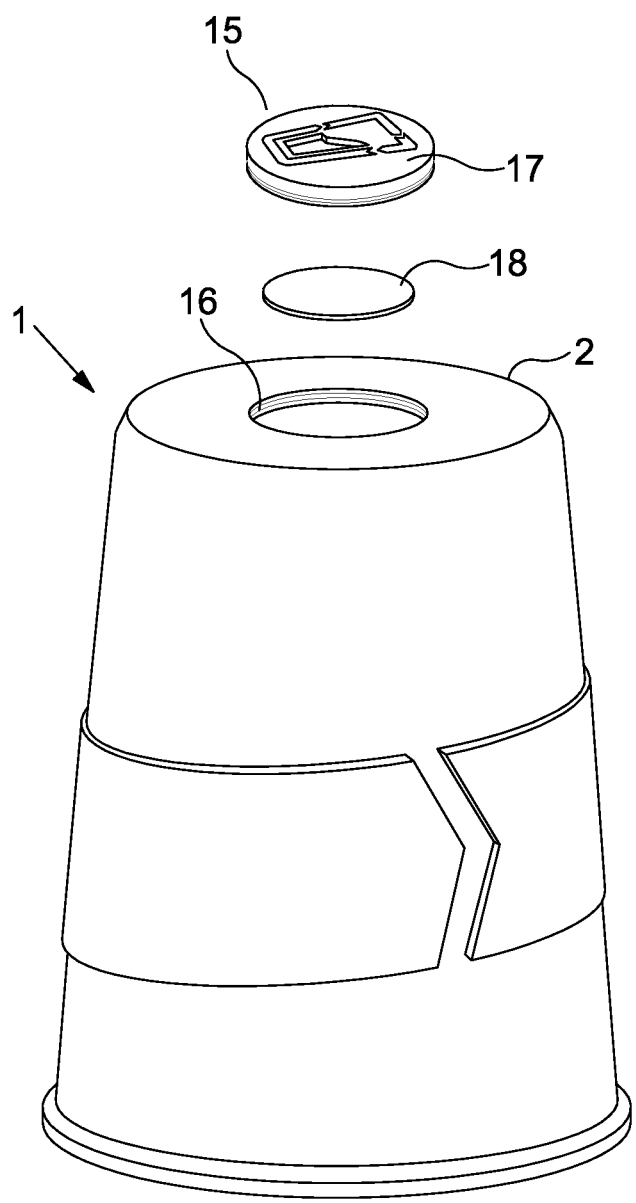
FIG. 3 shows a perspective exploded view of the embodiments of FIG. 1 and FIG. 2.

FIG. 3 shows base 2 in greater detail where it is envisaged that it has a recessed portion 16 in what would otherwise be a substantially flat lower base surface. Recessed portion 16 is disc-shaped and coaxial with the cup. The recessed portion has an inner wall which is internally threaded in order to mate with the correspondingly threaded perimeter of cap 17. A tag 18 may similarly be disc-shaped to also fit within the recessed portion 16 and be retained therein once the cap 17 is screwed into place. Whilst the cap 17 incorporates recessed portions corresponding to the projections 14 in the driver 10, the engagement with the correspondingly threaded wall of the base of the cup may preferably be such that it is difficult to reverse in order to allow the tag to be secured within the boundary of the cup for the entire life cycle of the cup. The tag may preferably be a so-called passive tag which may be read or interrogated when in proximity to a reader. In preferred embodiments, the tag may comprise a radio frequency (RF) identification in order to allow remote interrogation of the tag such as at a point of interest.

Figure 4:
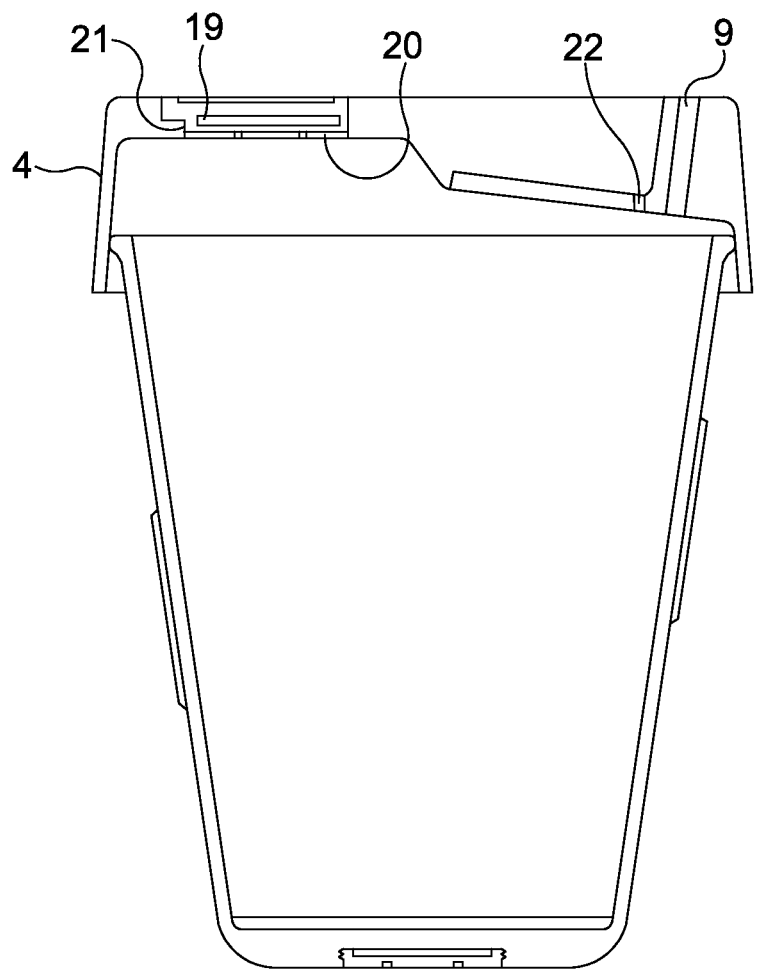
FIG. 4 shows a cross-section of the cup of FIGS. 1 to 3.

In a preferred embodiment the cup not only has a tag in its base but also as shown in FIG. 4 a tag as part of the lid 4. This second tag 19 may be secured on the inside of the lid by a cap 20 of similar configuration to the cap described in FIG. 3. This figure shows the interaction between the threaded portion 21 of disc 20 and the threaded portion provided in the recessed portion on the underside of the lid. The tag may be integrally formed with the cap and/or may sit in a further recessed portion located on the upper surface of cap 20. A through hole 22 is also shown in addition to the main oblong aperture 9.

Figure 5C:
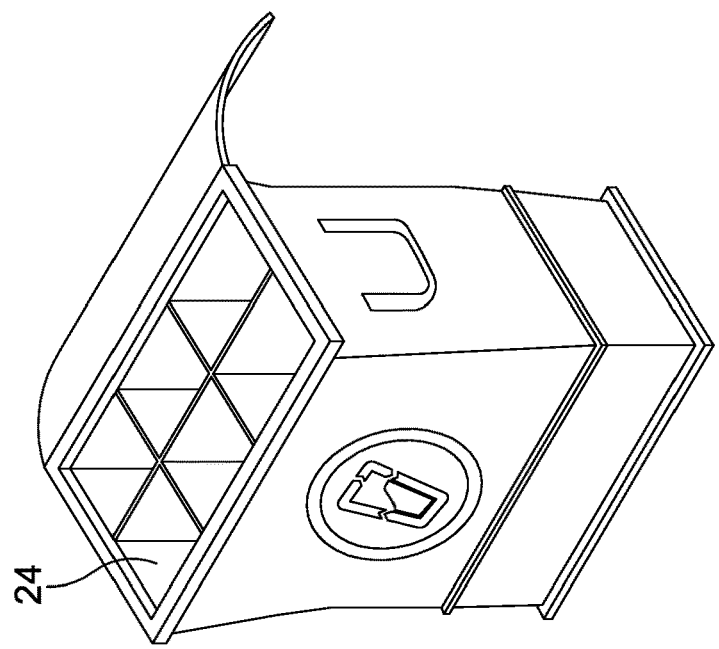
FIG. 5 show a perspective view, a side elevation view and a further perspective view of a carrier suitable for collecting cups of the kind in question.
Figure 5B:
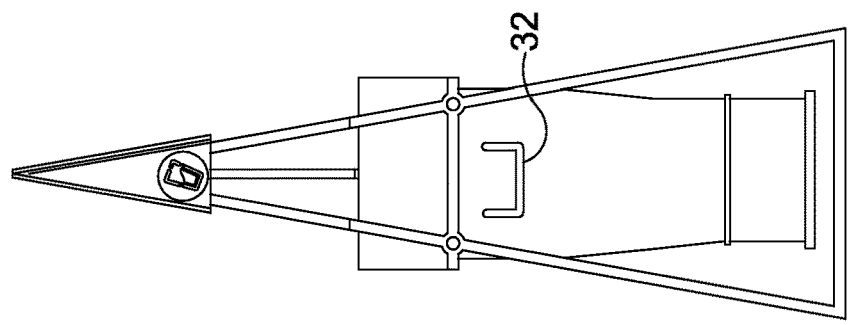
Figure 5A:
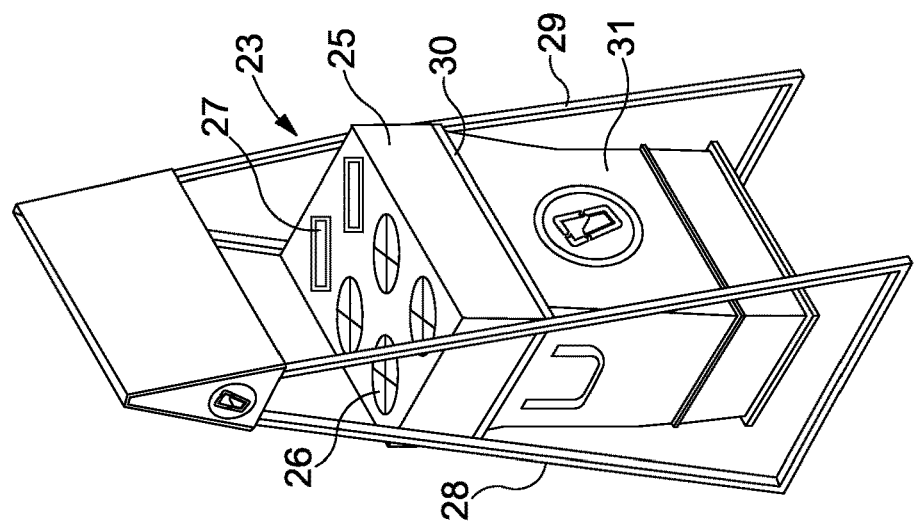

FIG. 5 shows a carrier generally referenced 23 for carrying a plurality of cups of the kind described with respect to the previous figures. The carrier may also comprise a remotely interrogatable tag for identifying the carrier itself. A number of compartments as shown in FIG. 5C such as compartment 24 are provided for receiving the cups and the lids as appropriate. These compartments are elongate in the vertical direction and correspond largely with the width of a cup in order to encourage the stacking of cups in a closely contiguous configuration. This is particularly advantageous in terms of providing relatively compact carriers for maximum transport of large volumes of used cups and lids. In order to encourage the separation of the cups from the lids, a lid 25 comprises two different kinds of apertures. A first kind of aperture such as aperture 26 is sized and shaped to allow the insertion of a cup whilst a second kind of aperture 27 is sized and shaped to allow the insertion of a lid and prevent the insertion of a cup. Aperture 26 has a generally circular configuration whilst aperture 27 is rectangular. The carrier incorporates two triangular supporting members 28 and 29 which elevate the carrier above the ground as shown in FIG. 5B. A rectangular junction member 30 is provided to secure the carrier to the side legs. The external walls such as wall 31 of the carrier may be of relatively flexible material in order to allow for transportation in a collapsed form. One or more handles may be provided such as handle 32 which may pivot relative to the external wall of the carrier in order to allow an operator's hand to relatively straightforwardly grab the carrier for further processing.

Figure 6:
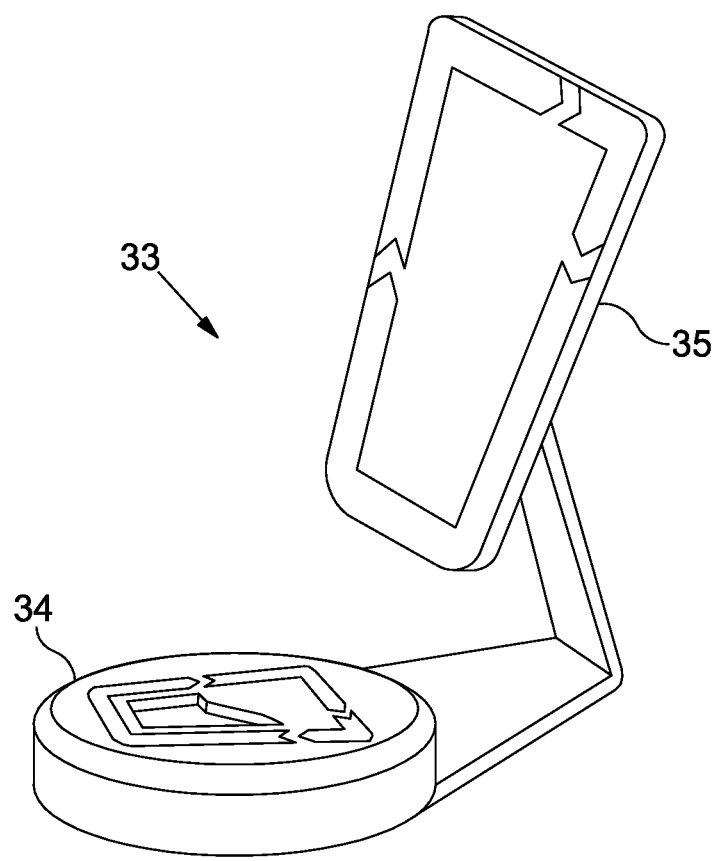
FIG. 6 shows an embodiment of a point of sale device.

FIG. 6 shows a potential interaction point generally referenced 33. This interaction point may be found at a sales point and may incorporate an RF tag reader 34 which allows the cup handling system to read a cup's unique identifying number whilst also allowing an operator to input on a touch screen 35 the selection of hot drink in order to allow the cup handling system to receive at a remote processing module (not shown in the figure) signals representative of at least one or more of the following factors: a date and time stamp of an interaction, an identification of the point of sale, an identification of an individual interaction with the system and an identification of the cup.

In preferred embodiments, the signals representative of the factors are dispatched to a cloud-based application where the remote processing module resides and where a profile of various interactions is progressively built up. The point of sale device 33 may also provide information with respect to its location, the time and date of purchase, the kind of beverage, and the quantity of beverage. The input obtained from the point of sale device may also feed into the remote processing module which would aggregate the data to determine a profile for one or more of the following: an individual cup, and a point of sale.

Furthermore, the remote processing module may obtain information feeds from the location of a carrier which may also be associated with a number of cups in need of cleaning and further processing. In this context, the module may be adapted or configured to calculate the distance between a point of initial interaction such as at the point of sale device and the recorded location of the carrier. This would allow the return events to be monitored and analysed. This may for example allow push notifications to be sent with appropriate notifications with potential awards for having returned the cup or alternatively notifications with the dispatch of a penalty charge notice for non-returns. This would also allow more accurate promotional and marketing activities to be developed.

Figure 7:
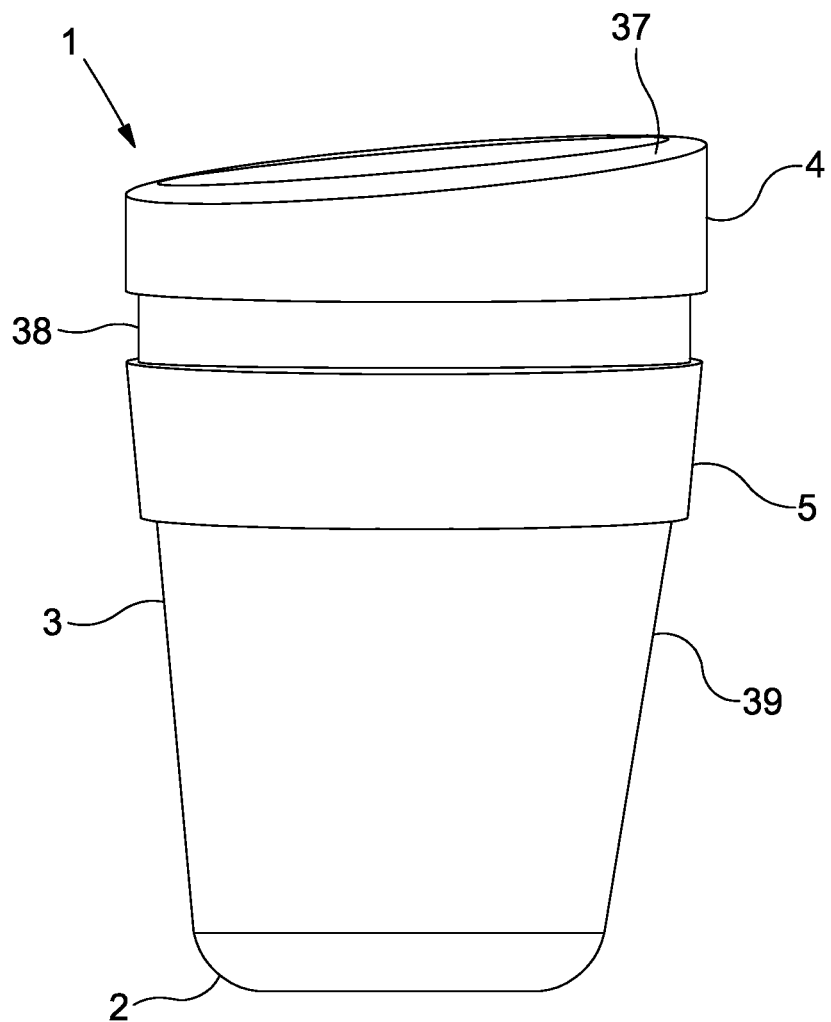
FIG. 7 shows a side elevation view of a further embodiment of a cup.
Figure 8:
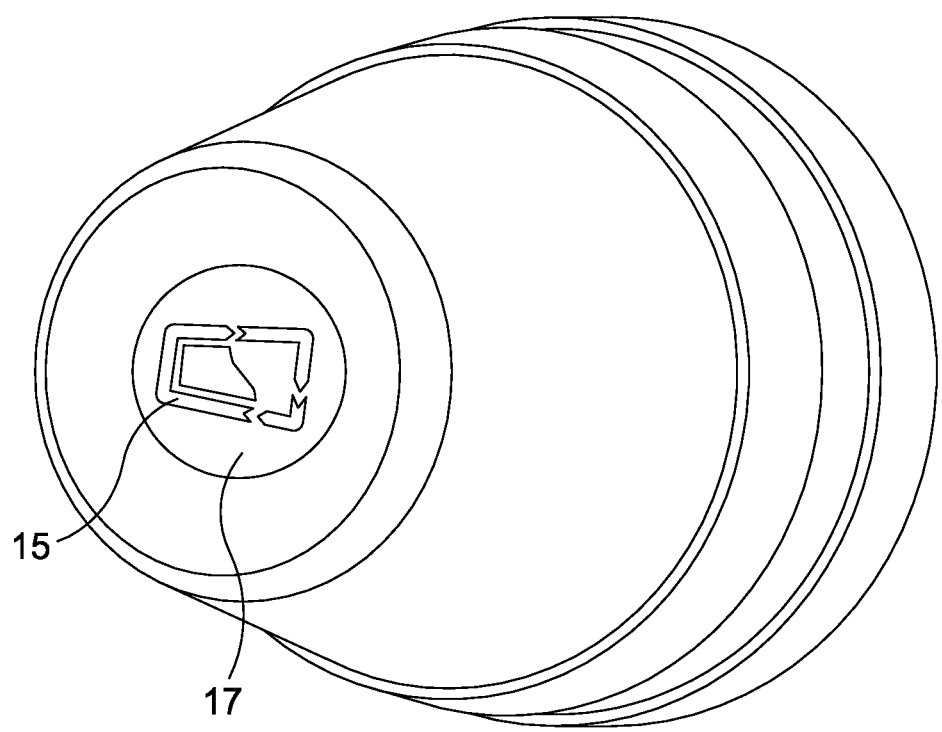
FIG. 8 shows the underside of a perspective of the cup of the embodiment of FIG. 7.
Figure 9:
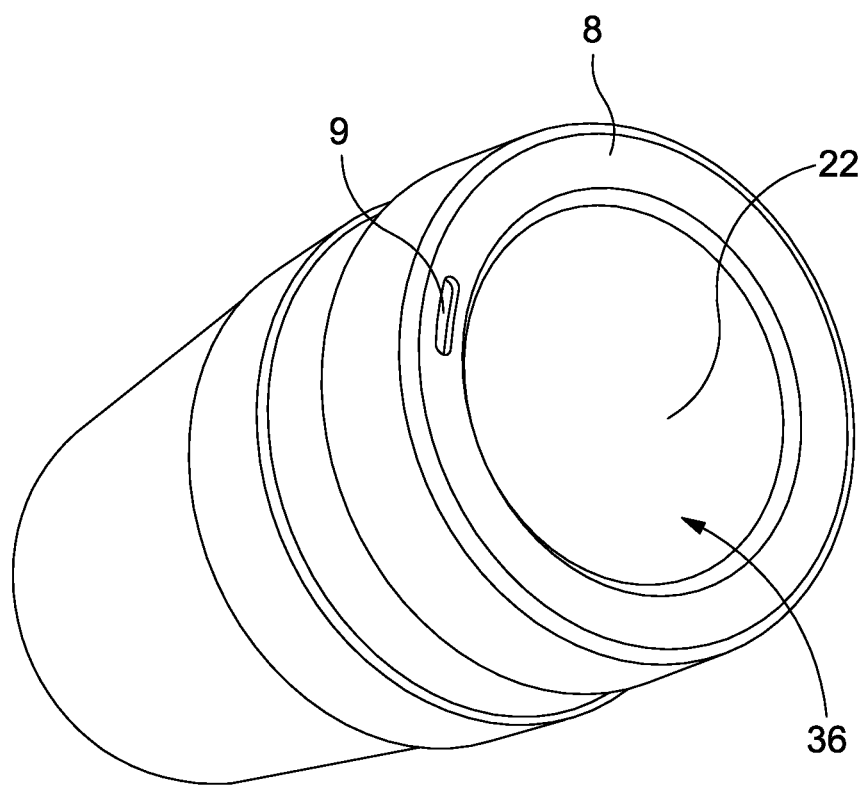
FIG. 9 shows a perspective view of the embodiment of FIGS. 7 and 8.

FIGS. 7 to 9 show a further embodiment of the invention where identical reference numerals to those in FIGS. 1 to 4 have been retained for simplicity. In this embodiment however the profile of the lid 4 is different as it increases in height across its width. At its highest point as shown by numerical reference 37 in FIG. 7, aperture 9 is provided through which beverage may exit the cup. Advantageously, in this embodiment a part-spherical recessed portion 36 (as shown in FIG. 9) is located within rim 8. Furthermore, the annular projecting band 5 extends about the perimeter of a section of the walled portion of the cup. The upper and lower edges 38 and 39 (as shown in FIG. 7) extend in a plane perpendicular to the longitudinal axis of the cup; whereby advantageously they may be suitable for stacking. Furthermore, in this embodiment, the disc with its separate tag or with its integral tag will be sonically welded into the base of the cup, meaning that once welded in position it can't be removed. Therefore, the discs would not require any perimeter threads as in a previous embodiment.

Figure 10:
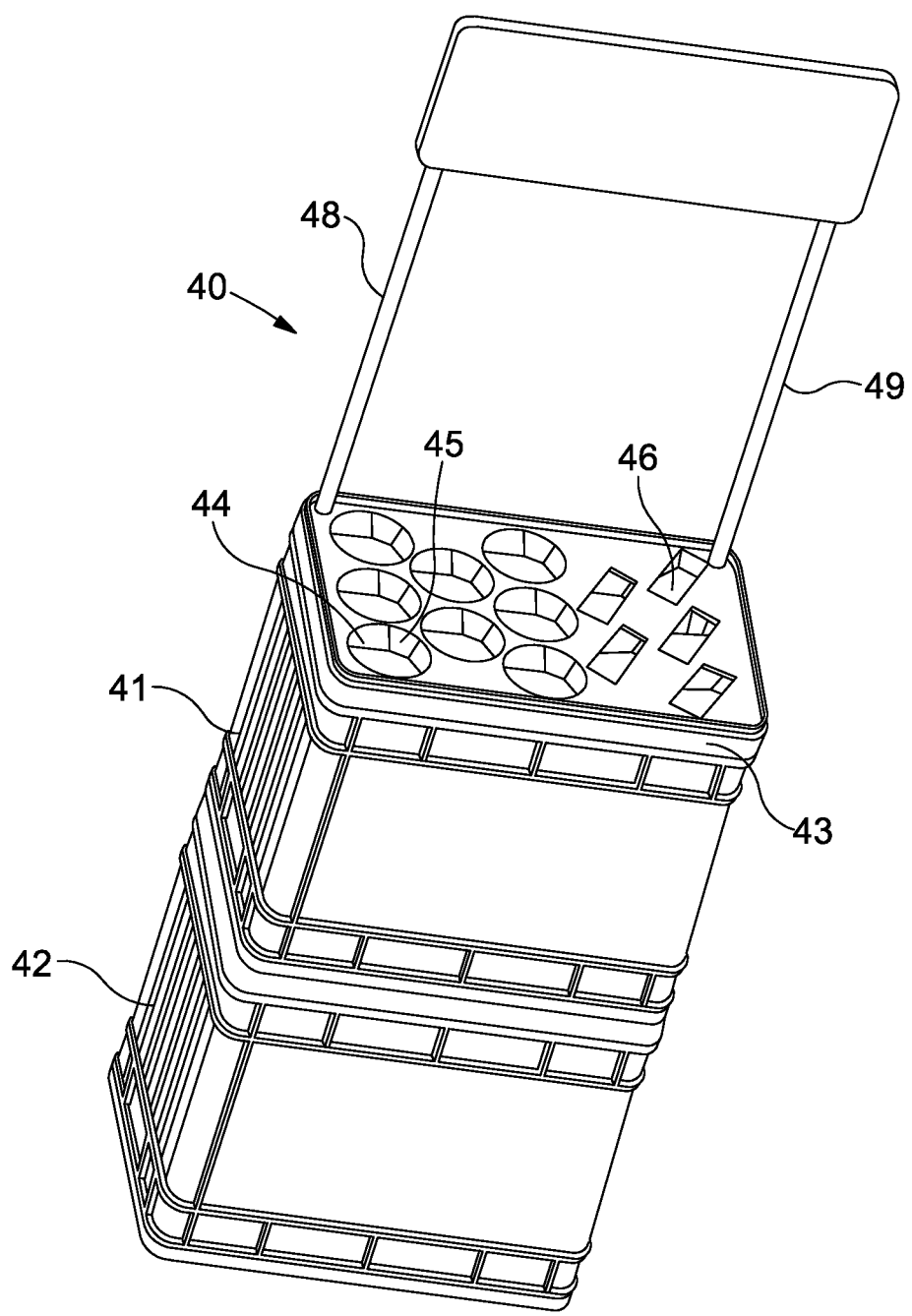
FIG. 10 shows a perspective view of a further embodiment of a carrier.
Figure 11:
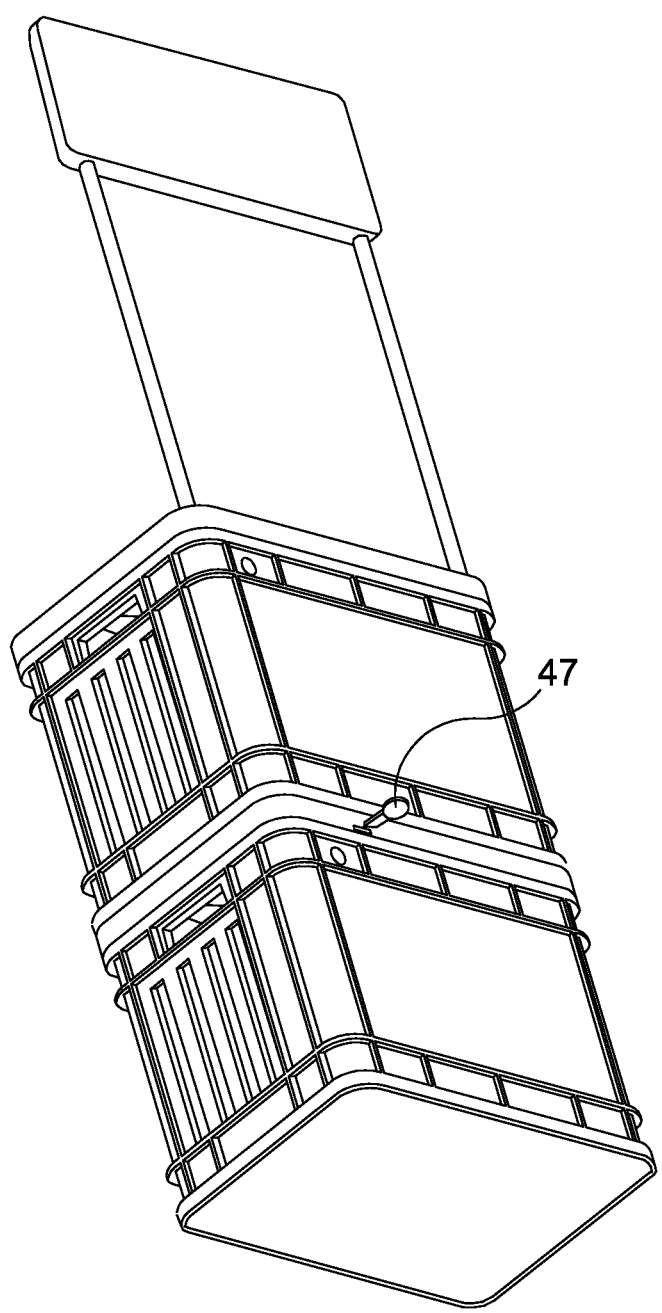
FIG. 11 shows a perspective view of the embodiment of FIG. 10.
Figure 12:
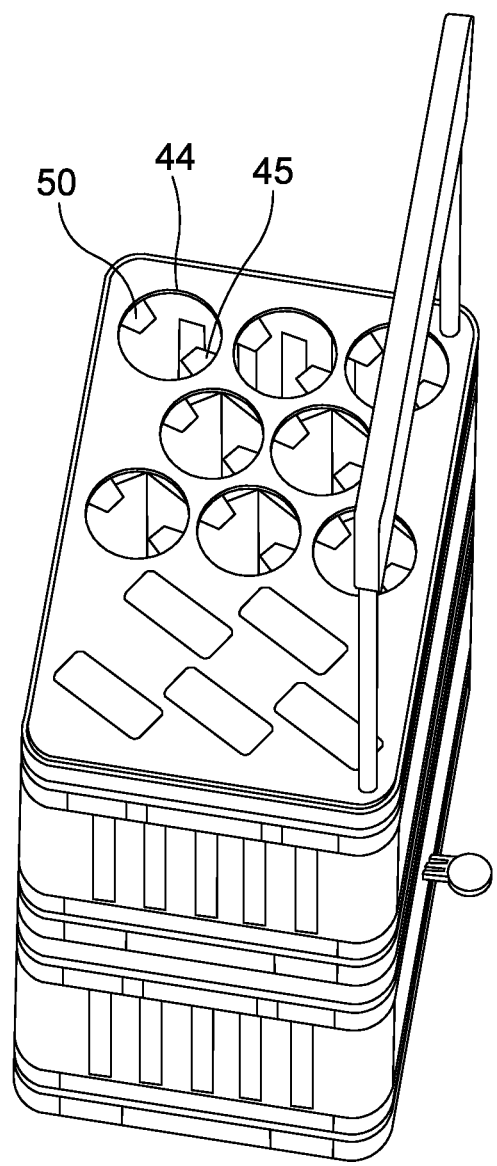
FIG. 12 shows a top perspective view of the embodiment of FIGS. 10 and 11.

A further carrier embodiment is shown in FIGS. 10, 11 and 12. In preferred embodiments, the carrier may incorporate a plurality of stacked substantially parallelepipedal cases. The carrier of FIG. 10 comprises cases 41 and 42. Each case has a lid such as lid 43 with the plurality of apertures of the kind described in a previous embodiment. In addition, however, instead of simply incorporating a circular aperture for the cup compartments, the circular apertures such as aperture 44 is provided with at least one projection 45 which projects radially inwards and presents a barrier for any attempted removal of a cup once placed within the case. Furthermore, this system also encourages the removal of the lid of the cup so that these may more appropriately be inserted through their rectangular apertures such as aperture 46. Each carrier may also incorporate a remotely interrogatable tag for identifying the particular case or carrier. The embodiment of FIG. 11 envisages that the lid of the case or carrier may incorporate an oblong slot for the insertion of a key or disc 47 which may incorporate a housing and a readable RF ID component located within the housing. Preferably, the key insert releases the lid from the case allowing contents to then be removed and washed. It is envisaged that the RF ID tag may be specific to the case or carrier in question and may also optionally have information with regard to its location. In addition, the various stacked carriers or cases may be held together by one or more beams 48 and 49 which may be provided through appropriately sized tunnels through a side wall of the cases. These beams 48 and 49 may pass through a plurality of cases in order to act as a junction member between adjacent stacked cases.

FIG. 12 shows in greater detail the various tubular compartments which serve to segregate the cups and lids in order to optimise their stacking and retention within the case. The apertures may also present more than one radial projections for example in aperture 44 two diametrically opposite projections 45 and 50 are envisaged.

Having described in detail various components of the system, several advantages arise when considering their interaction with an appropriate cup handling system.

Figure 13:
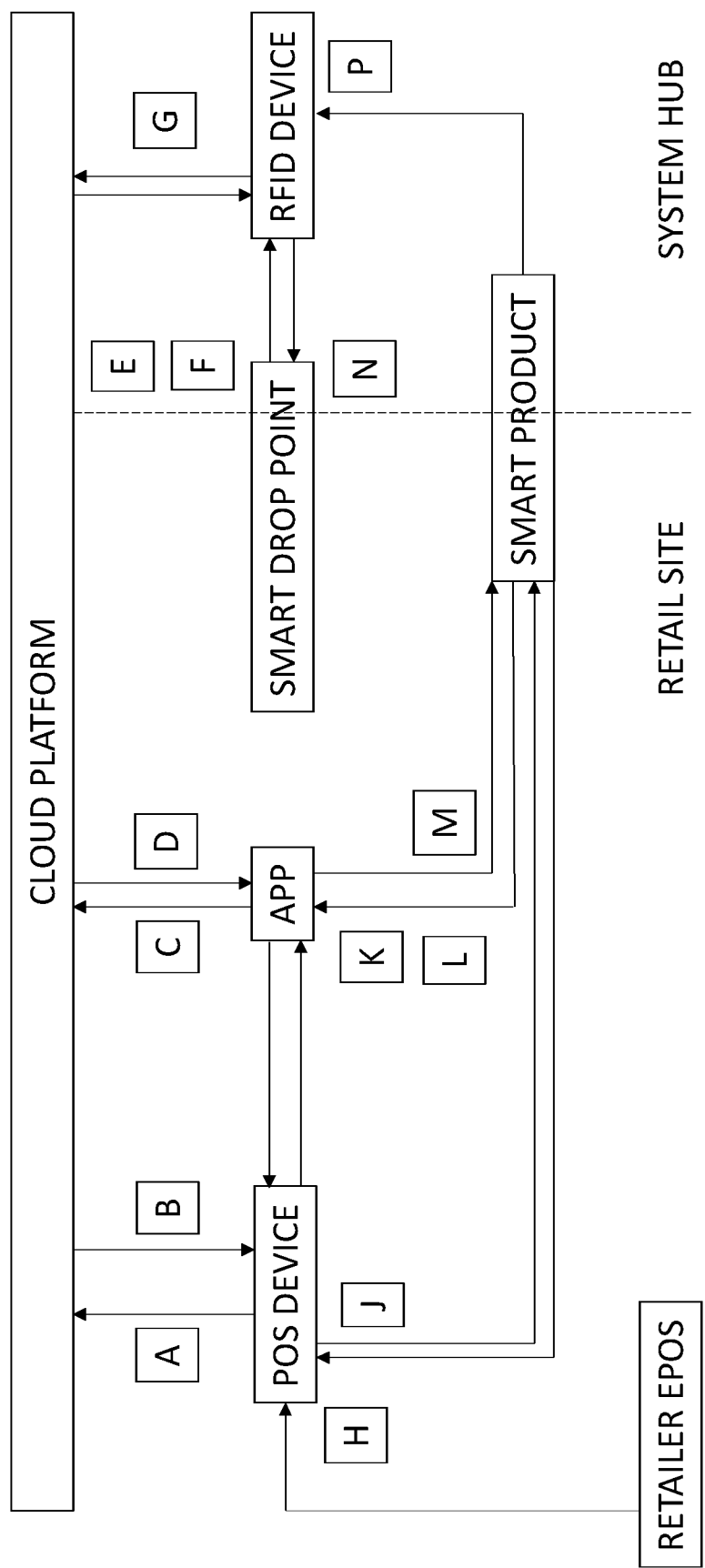
FIG. 13 shows a flow chart of the interaction between the processing module and the various components which interact with it.

The cup handling system as shown in FIG. 13:
improves the efficiency of handling the cycle of purchasing a beverage filled cup,
facilitates the consumption of the beverage in an almost infinite number of locations and thereafter a recuperation of the cups at a smart drop point for cleaning and further processing and then returning to a point of sale; thus providing an efficient environmentally friendly cycle of re-usable cups; Optionally, the system provides RFID enabled trackable cups or RFID enabled trackable food and beverage packaging which may be optimised for return and reuse;
oversees this complex process and allows the precise quantifying of these complex moving components;
enables the understanding of supply and demand of food and beverage and forecasts volumes over time; and/or
facilitates the receipt and the pushing of information to and from several critical points of interaction; in preferred embodiments, the system facilitates the pushing of information to or from a IoT cloud platform. The IoT cloud platform may be a REST-style API built using Laravel 5.6 on PHP 7.2 and MySQL.

As has already been described in detail one of the points of interaction may be a point of sale device which may be configured to:
Assign a cup ID/name;
Assign a module for counting down the uses for a cup;
Assign a member ID for a particular cup at a particular time;
Associate a drink-type;
Log a time and date stamp;
Log a location coordinate;
Receive regular update;
allowing digital media interaction during the sale process as a marketing opportunity for brands.

The system may be configured as a REST+JSON-style API. It may be configured to allow the submission of requests for standard CRUD operations via standard HTTP verbs GET (retrieve), POST (create), PUT (update), Delete. It may also be configured to allow the submission of query parameters as regular HTTP params, not as JSON.

A postman configuration file may be available which includes example requests for all endpoints, which is very useful for inspecting the API and testing requests interactively.

With respect to potential HTTP set up, the live service may be found at https://api.cupclub.com/. The initial service also uses a versioning prefix of /v1, and all requests may include that. All requests shown in these docs may be relative to this base URL. The API may optionally only be available via JSON; there is no browser-compatible interface. All requests should set the following HTTP headers: Accept: application/json; Content-Type: application/x-www-form-urlencoded; and Cache-Control: no-cache.

This also indicates that all request bodies (which inherently does not apply to GET requests, for which the Content-Type header is not applicable) must use the standard x-www-form-urlencoded format. The live server supports HTTP/2 and requires TLS encryption, which has a very strict configuration that only supports TLS 1.2 with AEAD ciphers. Any modern HTTP client should have no problem with this, but older ones might, for example Java 6.

In one embodiment with respect to authentication, most endpoints require authentication before any other requests. Requests should be sent as a POST request to the /authenticate endpoint and include email and password parameters, for example:
POST/v1/authenticate HTTP/1.1; Host: api.cupclub.com; Accept: application/json; Content-Type: application/x-www-form-urlencoded; Cache-Control: no-cache; email=admin%40example.com&password=correct+horse+battery+staple.

In one embodiment, a successful response to this request includes information about the user that logged in, like this:

```
{
"id": 1,
"created_at": "2018-03-17 16:11:13",
"updated_at": "2018-03-17 15:11:56",
"type": "admin",
"email": "admin@example.com",
"verified": 1,
"name": "Alice Admin",
"cctoken": null,
"api_token":
"ClNEGtuw8MTS9ORlNvl5OxzNqL5DOGU9pQ1LDaFqP73a21S6N7tzKglriekV",
"yearofbirth": null,
"preferences": null
}
```

Clients should extract the api_token value and include it in all subsequent requests in an authorization bearer header of the form:
Authorization: Bearer <api_token>

Any request without a valid token to an endpoint that requires authorization will receive an HTTP 401 Unauthorized error code. The postman configuration file has built-in support for this mechanism, so follow that as an example. To terminate a session, clients can call the/logout endpoint, after which the api_token value will no longer be accepted.

In test configurations (for example when running locally), the following user accounts are defined, all using the same password "correct horse battery staple" (for reference):
User type email; admin admin@example.com; consumer consumer@example.com; retailer retailer@example.com; posdevice posdevice@example.com; location location@example.com; depot depot@example.com In one embodiment, there are 6 entity types: Users; Retailers; Locations; Posdevices; Cups Transactions. These all support the standard GET/POST/PUT/DELETE HTTP verbs, but some require specific authorization via an appropriate user type associated with the current login.

There are a few endpoints that are not associated with specific entities: Post/authenticate used to request permission to connect to the API as a specific user. See the authentication section for more details; Post/logout terminates the validity of the api_token obtained via /authenticate, effectively logging the user out; Post/register used to create new consumer-type accounts. Accepts email, password, password_confirmation (which should contain the same value as password) and name parameters.
Example Request:
   POST/v1/register HTTP/1.1
   Host: api.cupclub.com
   Accept: application/json
   Content-Type: application/x-www-form-urlencoded
   Cache-Control: no-cache
   email=user%40example.com&password=H3lloo&
      password_confirmation=H3lloo&name=Joe+User
Response:

```
{
"email": "user@example.com",
"name": "Joe User",
"updated_at": "2018-03-13 21:51:04",
"created_at": "2018-03-13 21:51:04",
"id": 36,
"api_token":
"TNLtKWrYyKg5ANGIe5KCpcx5KOlTYwRn7wdVPpGqvHqmTA9MvQyimD7i22Pv"
}
```

This endpoint will send a message to the provided email address containing a link that will verify the account, and that must be done before the newly defined user can log in.

GET/verify/{confirmation_code} is used to verify newly created accounts, and is the URL used in the email messages sent to new users. This is the only endpoint that is accessible via a browser, and does not require an Accept header. Valid requests to this endpoint will only work once as the confirmation code is deleted after use.

Users are the users of the system. These cover all user types, each having different capabilities for which they may be authorized. The user types are: consumer; retailer; location; posdevice; depot; admin.

In one embodiment, each entity type will usually have an associated user that can be used for logins, for example a retailer entity will have an associated retailer-type user account that has retailer-specific privileges that a consumer-type account does not have.
POST/Users
This is how new users are created; this end point may only be called by an admin user; normal users will be created via the/register endpoint.
GET/Users
This provides a complete list of all users in the system. This endpoint may only be called by admin users.
GET/Users/{Id}
This provides information about a specific user, using their internal ID value, which can be obtained via the/users endpoint, or in the response to/authenticate. Admin users can request information about any user; everyone else can only request information about their own ID.
GET/Users/{Id}Transactions
This provides a list of transactions relating to a specific user, using their internal ID value. Admin users can request information about any user; everyone else can only request information about their own ID.
GET/Users/{Id}Statistics
This provides account statistics relating to a specific user, using their internal ID value. Admin users can request information about any user; everyone else can only request information about their own ID. At present this only includes a transaction count.

GET/Users/Me

This provides information about the user currently logged in.

GET/Users/Me/Transactions

Retrieve a list of transactions for the currently logged-in user.

GET/Users/Me/Statistics

Retrieve account statistics for the currently logged-in user. At present this only includes a transaction count.

PUT/Users/{Id}

Updates properties of a user via its internal ID. May only be called by an admin, or a user with a matching user ID.

DELETE/Users/{Id}

Deletes the specified user ID. May only be called by an admin, or a user with a matching user ID. Note that deletes are real and permanent.

Retailers represent the owners of Locations. These are just simple containers with only a name attribute.

POST/Retailers

Creates a new retailer entity. May only be called by an admin. Requires only a unique name parameter:
  POST/v1/retailers/HTTP/1.1
  Host: api.cupclub.com
  Accept: application/json
  Content-Type: application/x-www-form-urlencoded
  Authorization: Bearer FtMiD3Uj4dkeVc0e0zpJd0VrKHylu1eO2ky6SpqXec ZWvy8VWtlzGFuvJNd9
  Cache-Control: no-cache
  name=New+Retailer+123
Response:

```
{
"name": "New Retailer 123",
"updated_at": "2018-03-18 15:31:28",
"created_at": "2018-03-18 15:31:28",
"id": 4
}
```

GET/Retailers

Retrieves info about all retailers. This endpoint is accessible to all and does not require a login, so it can be used to obtain a public list of retailers.

GET/Retailers/{Id}

Retrieves info about a single retailer with this ID. This endpoint is accessible to all and does not require a login.

GET/Retailers/{Id}/Locations

Retrieves info about all locations owned by a retailer with this ID. This endpoint is accessible to all and does not require a login.

PUT/Retailers/{Id}

Updates the specified retailer. See POST for available params. May only be called by an admin or a retailer with a matching ID.

DELETE/Retailers/{Id}

Deletes the specified retailer. May only be called by an admin or a retailer with a matching ID.

Locations are the places that vend products using Cup Club cups. Every location is associated with one Retailer.

POST/Locations

Creates a new location entity. Requires valid retailer_id, name, address (optional), type, longitude and latitude params. This may be called by admins, but also by a retailer user with a matching retailer_id, or by a location user with a matching ID. The type parameter should be one of: store; drop point; cup club hub Example Request:
  POST/v1/locations/HTTP/1.1
  Host: api.cupclub.com
  Accept: application/json
  Content-Type: application/x-www-form-urlencoded
  Cache-Control: no-cache
  name=Coffee+Shop+1 &address=1%2C+the+road%2C+ Newtown&type=store&retailer_id=1&location= %7B%22type%22%3A%22Point%22%2C%22coor GET/Locations Retrieves info about all locations. This endpoint is accessible to all and does not require a login, so it can be used to obtain a public list of locations.

GET/Locations/{Id}

Retrieves info about a single location with this ID. This endpoint is accessible to all and does not require a login.

GET/Locations/{Id}/Posdevices

Retrieves info about all posdevices associated with a location with this ID. This may be called by admins, but also by a retailer user with a matching retailer_id, or by a location user with a matching ID.

PUT/Locations/{Id}

Updates the specified location. See POST for available params. This may be called by admins, but also by a retailer user with a matching retailer_id, or by a location user with a matching ID.

DELETE/Locations/{Id}

Deletes the specified location. This may be called by admins, but also by a retailer user with a matching retailer_id, or by a location user with a matching ID.

Posdevices

These represent point-of-sale devices that ultimately will create links between a consumer and the use of a particular cup at a particular location. This may or may not be associated with a financial transaction.

POST/Posdevices

Creates a new posdevice entity. Requires valid type, location_id, and version parameters, where type is one of: type1; type2; type3. This may be called by admins, but also by a retailer user with a matching retailer_id, or by a location user with a matching ID.

Example request: POST/v1/posdevices/HTTP/1.1; Host: api.cupclub.com
  Accept: application/json; Content-Type: application/x-www-form-urlencoded
  Authorization: Bearer FtMiD3Uj4dkeVc0e0zpJd0VrKHylu1eO2ky6SpqXec ZWvy8VWtlzGFuvJNd9
  Cache-Control: no-cache
  type=type1&location_id=1&version=1234
Response:

```
"type": "type1",
"location_id": "1",
"version": "1234",
"updated_at": "2018-03-18 16:22:31",
"created_at": "2018-03-18 16:22:31",
"id": 31,
"location": {
"id": 1,
"created_at": "2018-03-18 15:31:07",
"updated_at": "2018-03-18 16:22:31",
"type": "drop point",
"name": "Balistreri PLC",
```

-continued

```
"retailer_id": 2,
"address": "9352 Dare Crest Suite 996\nKeenanfort, AR 62349-9297",
"user_id": 7,
"longitude": -0.118092,
"latitude": 51.509865
}
}
```

This particular example included the details of the location associated with this posdevice; this information may not always be present, but can save a roundtrip if it is.

GET/Posdevices

Retrieve a list of all defined posdevices for all locations. May only be called by admins.

GET/Posdevices/{Id}

Retrieve info on a single posdevice. This may be called by admins, but also by a retailer user with a matching retailer_id, or by a location user with a matching ID.

GET/Posdevices/{Id}/Transactions

Retrieve a list of transactions for this posdevice. This may be called by admins, but also by a retailer user with a matching retailer_id, or by a location user with a matching ID.

GET/Posdevices/{Id}/Statistics

Retrieve account statistics for this posdevice. At present this only includes a transaction count. This may be called by admins, but also by a retailer user with a matching retailer_id, or by a location user with a matching ID.

PUT/Posdevices/{Id}

Updates the specified posdevice. See POST for available params. This may be called by admins, but also by a retailer user with a matching retailer_id, or by a location user with a matching ID.

DELETE/posdevices/{id} deletes the specified posdevice. This may be called by admins, but also by a retailer user with a matching retailer_id, or by a location user with a matching ID.

POST/Cups

Creates a new posdevice entity. Requires valid status and rfid parameters, where status is one of: pending (default, for new cups); in use; end of life. The rfid parameter is free-form case-sensitive ASCII up to 255 chars, but must be unique and should conform to whatever coding scheme has been defined.

This may be called by admins and depot users.

Example Request:
POST/v1/cups/HTTP/1.1
Host: api.cupclub.com
Accept: application/json
Content-Type: application/x-www-form-urlencoded
Authorization: Bearer
FtMiD3Uj4dkeVc0e0zpJd0VrKHylu1eO2ky6SpqXec
  ZWvy8VWtlzGFuvJNd9
Cache-Control: no-cache
status=pending&rfid=12345567892

Response:

```
{
"status": "pending",
"rfid": "12345567892",
"updated_at": "2018-03-18 16:35:14",
"created_at": "2018-03-18 16:35:14",
"id": 21
}
```

GET/Cups/

Retrieve a list of all defined cups. May only be called by admins and depot users.

GET/Cups/{Id}

Retrieve info on a single cup by its internal ID. May only be called by admins and depot users.

GET/Cups/Rfid/{Rfid}

Retrieve info on a single cup by its rfid value. May only be called by admins and depot users.

GET/Cups/{Id}/Transactions

Retrieve a list of transactions for this cup. May only be called by admins and depot users.

GET/Cups/{Id}/Statistics

Retrieve account statistics for this cup. At present this only includes a transaction count. May only be called by admins and depot users.

Transactions record events and interactions between users, locations, posdevices, and cups. Getting specific transactions directly is generally only available to admins, but most entities have an endpoint for retrieving all transactions relating to them.

POST/Transactions

Creates a new transaction entity. Requires valid type and optionally any of posdevice_id, location_id, cup_id, user_id, plus info-only orderinfo and receipt_id parameters, where type is one of: deliver to location; loan; return; wash; end of life.

This may be called by admins, posdevice, and depot users.

Example Request:
POST/v1/transactions/HTTP/1.1
Host: api.cupclub.com
Accept: application/json
Content-Type: application/x-www-form-urlencoded
Authorization: Bearer
FtMiD3Uj4dkeVc0e0zpJd0VrKHylu1eO2ky6SpqXec
  ZWvy8VWtlzGFuvJNd9
Cache-Control: no-cache
type=loan&orderinfo=aboryz&receipt_id=abc1234&
  posdevice_id=1&cup_id=1&location_id=1&user_id=1

Response:

```
{
"type": "loan",
"orderinfo": "abcxyz",
"receipt_id": "abc1234",
"posdevice_id": "1",
"cup_id": "1",
"location_id": "1",
"user_id": "1",
"updated_at": "2018-03-18 16:57:15",
"created_at": "2018-03-18 16:57:15",
"id": 51
}
```

GET/Transactions/

Retrieve a list of all defined transactions. May only be called by admins.

GET/Transactions/{Id}

Retrieve info on a single transaction by its internal ID. This may only be called by admins.

PUT/Transactions/{Id}

Updates the specified transaction. See POST for available params. May only be called by admins.

DELETE/Transactions/{Id}

Deletes the specified transaction. May only be called by admins.

Example Scenarios

These are some API call sequences for typical operations.
New Batch of Cups Arrives at Depot:
1. POST/authenticate As admin or depot user.
2. Scan cups with RFID reader
3. POST/cups Create a new record for each cup, including scanned RFID value and a status of pending.
4. POST/transactions Repeat for each cup, creating a wash-type record (new cups are sent straight to wash). ###Batch of cups sent to location
5. POST/authenticate As admin or depot user.
6. Scan cups with RFID reader
7. GET/cups/rfid/{rfid} Use RFIDs to look up internal cup_id of each cup.
8. POST/transactions Repeat for each cup, creating a deliver to location-type record including the appropriate location_id and cup_id values. ###Batch of cups arrives back from location
9. POST/authenticate As admin or depot user.
10. Scan cups with RFID reader
11. GET/cups/rfid/{rfid} Use RFIDs to look up internal cup_id of each cup.
12. POST/transactions Repeat for each cup, creating a wash-type record including the appropriate cup_id values.

The point of sale device may also be connected to the retailer's point of sale interface in order to provide appropriate cost and promotion information. Connecting the system's POS to a retailer point of sale, also allows the system to link retailer data with the system's data. This may be done either in real-time or through data stitching.

The point of sale device may be configured to dispatch signals representative of a number of factors to the remote processing module. These may include but are not necessarily limited to:
  Member ID confirmation;
  Cup ID;
  Number of uses remaining for cup;
  Drink types and quantities;
  Time and data log;
  Maintenance information such as a tampering event.

The remote processing module may send feedback to the point of sale device in terms of validation of a member ID. It may alternatively also reject a non-member. The remote processing module may also dispatch system and software updates as appropriate.

Another point of interaction may be when a user drops off the cup once it is used at an appropriate drop point. This interaction is optionally processed at another location where RF ID reading devices are provided such as at a collection point (in a transport vehicle) or a cleaning station where the used cup may be interrogated and signals representative of several factors may be once again sent to the remote processing module. In further embodiments, the system may be configured to know in real-time where products i.e. containers have been returned in real-time. These several factors may include for example:
  A cup check-in information;
  A cup ID;
  A time and data log;
  An indication of a status of tampering.

The remote processing module (which may be part of a cloud platform) may also interact with this kind of interaction point by providing system and software updates as appropriate.

It is possible that the RF ID device also assigns a location to a carrier or a case. It may also be that a drop point ID is assigned.

In addition to these bespoke interaction points a user interface may be provided in the form of an application on a smart device allowing a user to input factors such as:
  Their name;
  Their email address;
  Their preferred payment details;
  A retail sign-up location;
  Answers to tailored questions;
  Other kinds of information such as complaints.

The remote processing module may also provide the user with member ID confirmation and any appropriate system updates and software updates. In addition, notifications may be pushed to the user in the form of promotions or marketing information; notification/penalty charges for non-returns and impact metrics which provide the user with a sense of contribution to the beneficial process from an environmental point of view. In addition, in further embodiments, a user interface may be provided via an API integration with a third party application on a smart device. The system may be configured to provide integration as a so called "white label" where existing applications are already successful.

In addition, the application may require further information about gender and age. It may also provide specific promotions for a particular profile. It may also provide group memberships dependent upon education, workplace, office or retail. It can also provide accurate drinking habits and trends information.

The invention also envisages a GPS enabled functionality to associate geographic marketing campaigns based on customers' physical locations.

Using the labels of FIG. 13:
Label A:
Authentication:
  Requests member ID confirmation
Cup Check-Out Information
  Cup ID and uses remaining for cup
  Drink type(s) and quantities (price check)
  Time and date log
Maintenance:
  Tampering
Label B:
Authentication:
  Sends member ID confirmation or rejects non member
Maintenance:
  Systems update/software update
Label C:
Registration:
  Member name
  Member email
  Member payment details
  Retailer signup location
CRM:
  Q&A
  Complaints
Authentication:
  Relays member ID
Label D:
Comms:
  Notifications/penalty charge for non-returns
  Promo/marketing and content
  Impact metrics
Maintenance:
  Systems update/software update Label E:
Maintenance:
   Systems update/software update
Label F:
Data:
   Drop point ID
Label G:
Cup Check-In Information:
   Cup ID
   Time and date log
Maintenance:
   Tampering
Label H:
Data:
   Cup ID
Label J:
Data:
   Assign Cup ID/name (One off)
   Uses remaining for cup
   Member ID assigned
   Drink type
   Time and date log
   Location Log
Maintenance:
   Systems update
Label K:
Authentication:
   Member ID confirmation/rejection
Label L:
Data:
   Cup ID/name
   Cup travel time/distance
   Impact metrics
   Drink type(s) and quantities
Label M:
Comms:
   Content
   Gifts
Label N:
Data:
   Assign location
Label P:
Data:
   Cup ID FIGS. 14 and 15 show a cup generally referenced 101 suitable for carrying hot beverages. It comprises a base 102 and a walled portion 103 upwardly extending from the base. A lid 104 is attached to the upper most portion of the upwardly extending walled portion.

In a preferred embodiment, the cup also has measure lines such as line 105 as shown in FIG. 19 to denote 8 oz, 10 oz and 12 oz drink portions. In a further preferred embodiment, the cup may be suitable for containing 16 oz and may have a line denoting a 14 oz and/or a 16 oz portion.

Optionally, any of the embodiments considered may involve a surface of a component with a texture for reducing surface water retention so that little or no water droplets collect on the surface of cup and lid after washing.

FIG. 15 shows further detail of the lid where a semispherical recessed portion 107 is provided within a rim 108 which extends about the perimeter of the lid. Within the boundaries of the rim, an aperture 109 which may be preferably of oblong shape is provided. Aperture 109 facilitates the flow of beverage out of the cup dependent upon the mode of use. The addition of a through hole 106 made within the lid to facilitate the equalizing of the pressure within the cup during the drinking process.

Figure 17:
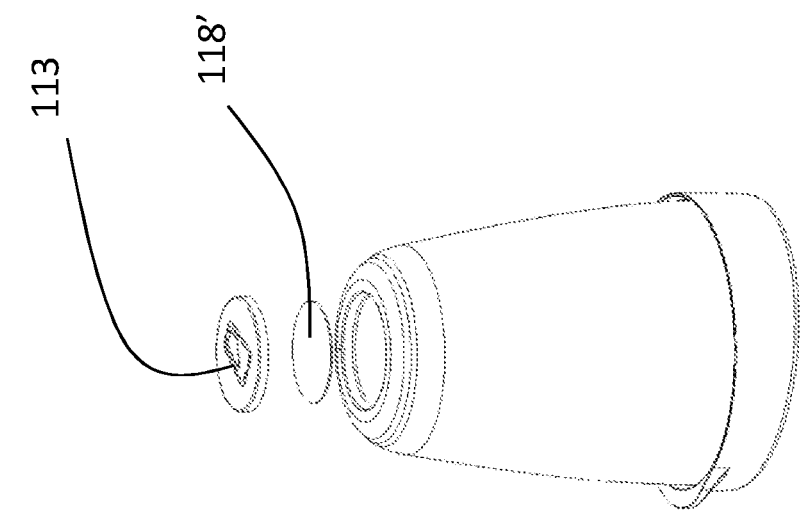
FIG. 17 shows an exploded perspective view of a further embodiment of the invention.
Figure 16:
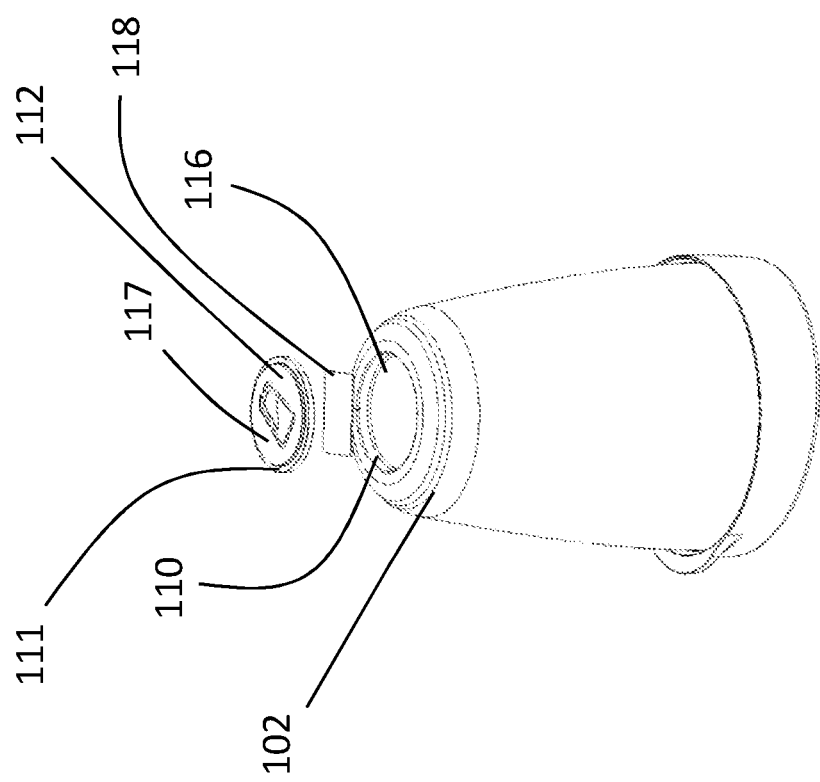
FIG. 16 shows an exploded perspective view of the container of FIG. 14.

FIG. 16 shows base 102 in greater detail where it is envisaged that it has a recessed portion 116 in what would otherwise be a substantially flat lower base surface. Recessed portion 116 is disc-shaped and coaxial with the cup. The recessed portion has an inner wall 110 which may be internally threaded in order to mate with a correspondingly threaded perimeter of cap 117. In a preferred embodiment, the cap is adhered to or welded to the base. The tag 118 may be rectangular as in FIG. 16 or similarly be disc-shaped as 118' to also fit within the recessed portion 116 as in FIG. 17. The cap 117 may also include an annular portion 111 which is of lower thickness than a central portion as shown in FIG. 16.

The cap 117 incorporates recessed portions 113 which may correspond to the projections 14 in the driver 10 of a previous embodiment. The tag 118 (or 118') may preferably be a so-called passive tag which may be read or interrogated when in proximity to a reader. In preferred embodiments, the tag may comprise a radio frequency (RF) identification in order to allow remote interrogation of the tag such as at a point of interest.

Figure 18:
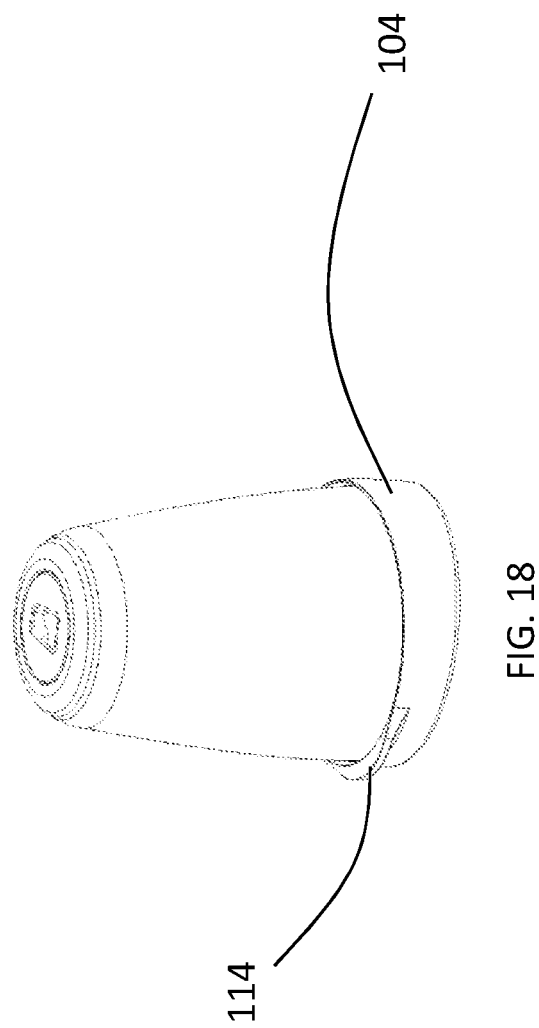
FIG. 18 shows a further perspective view of the container of FIG. 14.

FIG. 18 shows the cup upside down. The lid 104 incorporates a lateral or radial projection or tab 114. The tab 114 has a tapered upper portion and may optionally be located towards the lower most region of the lid.

Figure 21:
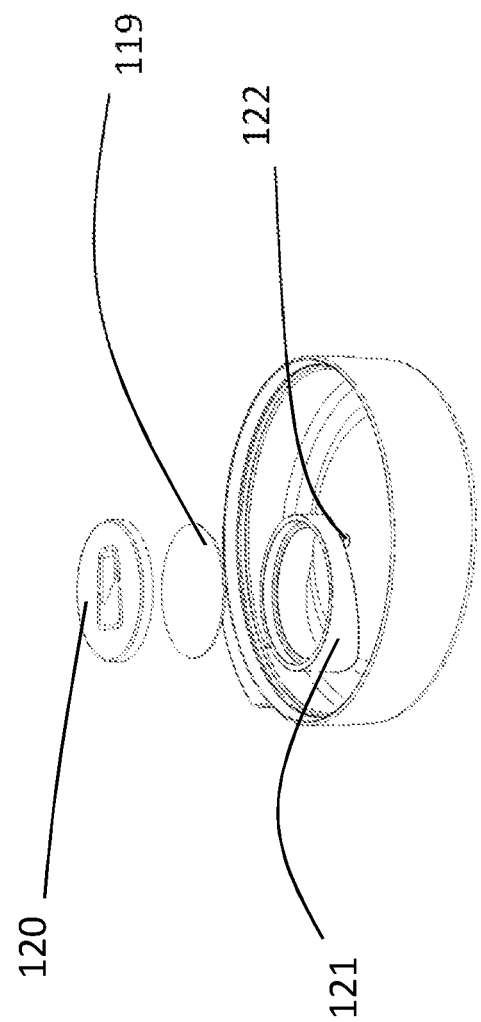
FIG. 21 shows an exploded perspective view of the embodiment of FIG. 14.

In a preferred embodiment, the cup not only has a tag in its base but also as shown in FIG. 20 a tag as part of the lid 104. As shown in FIG. 21, this second tag 119 may be secured on the inside of the lid by a cap 120 of similar configuration to the cap described in previous figures. This figure shows the interaction between a receiving portion 121 and the disc 120. The receiving portion has cylindrical walls which define a chamber for receiving the tag 119.

In further embodiments, the tag may be integrally formed with the cap. A through hole 122 is also shown in addition to the main oblong aperture previously described.

Figure 22:
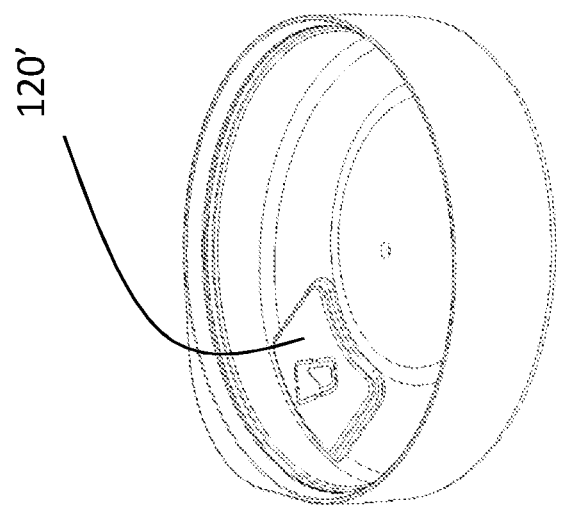
FIG. 22 shows a perspective view of the lid.

FIG. 22 shows a cover portion 120' which is secured over a tag of the kind described above. The tag 119' may be embedded in the plastics material as shown in FIG. 23.

Figures 23, 24:
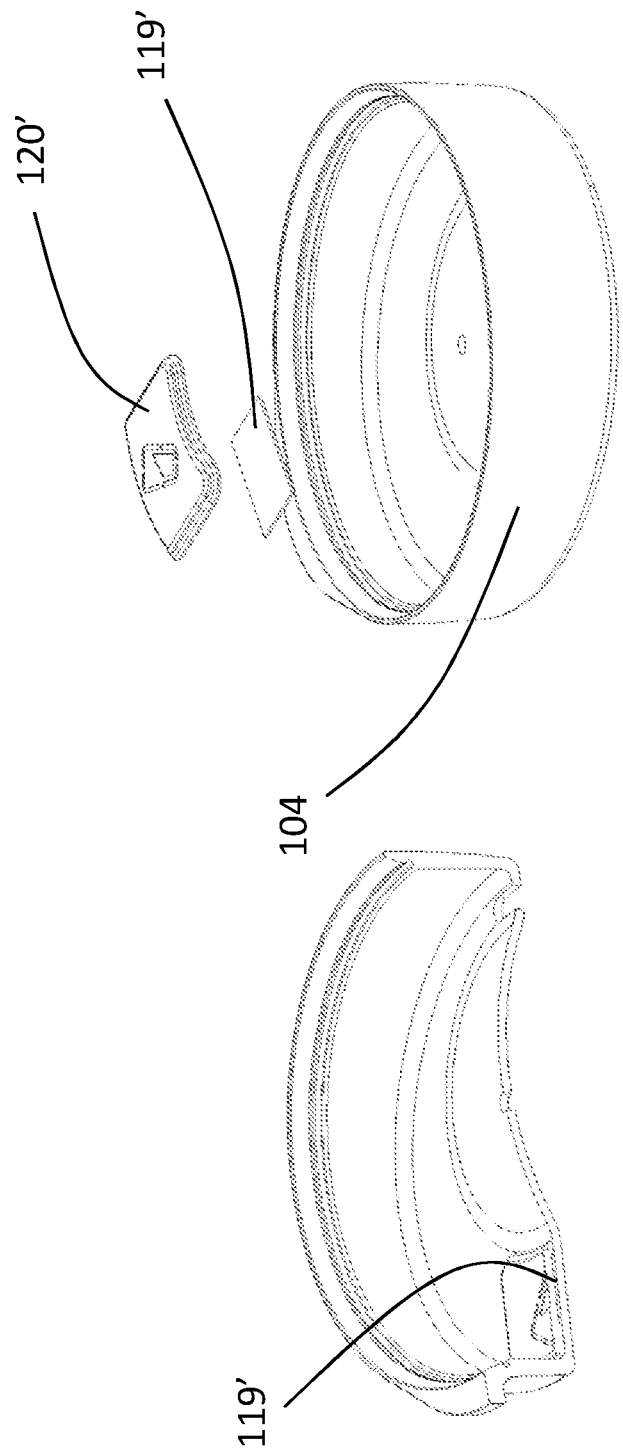
FIG. 23 shows a cross-sectional view of the lid.
FIG. 24 shows an exploded perspective view of the lid.

FIG. 24 shows an exploded view of lid 104, tag 119' and cover portion 120'.

FIG. 25 shows a carrier generally referenced 123 for carrying a plurality of cups of the kind described with respect to the previous figures. The carrier may also comprise a remotely interrogatable tag for identifying the carrier itself. A number of compartments as shown in FIG. 26 such as compartment 124 are provided for receiving the cups and the lids as appropriate. These compartments are elongate in the vertical direction and correspond largely with the width of a cup in order to encourage the stacking of cups in a closely contiguous configuration. This is particularly advantageous in terms of providing relatively compact carriers for maximum transport of large volumes of used cups and lids. Each compartment may be bounded by walls which form hexagonal compartments when viewed in cross-section. In order to encourage the separation of the cups from the lids, a lid 125 comprises two different kinds of apertures. A first kind of aperture such as aperture 126 is sized and shaped to allow the insertion of a cup whilst a second kind of aperture 127 is sized and shaped to allow the insertion of a lid and prevent the insertion of a cup. Aperture 126 has a generally circular configuration whilst aperture 127 is rectangular. One or more side recessed portion 132 allow an operator's hand to relatively straightforwardly grab the carrier for further processing. A castellation 128 protrudes upwards and may help locate the lid or allow the stacking of a plurality of carriers on top of each other. An upper panel 133 is provided as an upper cover for lid 125. The circular apertures have a flexible annular membrane to allow the insertion into the compartments and resist the removal of cups thereafter. Similarly, the rectangular apertures have an inner perimeter with a flexible portion to allow the insertion into the compartments and resist the removal of the lids thereafter.

The carriers of FIGS. 25 and 26 may also incorporate an RFID tag 134 located as part of the upper panel 133. The RFID tag 134 may be located in its own compartment 135 which is formed between side walls 136 and a cap 137 as shown in FIG. 28. The compartment may either protrude on the underside of the lid or the top of the lid.

The cups may potentially interact with an interaction point which may be found at a sales point and may incorporate an RFID tag reader of the kind previously described which allows the cup handling system to read a cup's unique identifying number whilst also allowing an operator to input on a touch screen or other input means the selection of hot drink in order to allow the cup handling system to receive at a remote processing module (not shown in the figure) signals representative of at least one or more of the following factors: a date and time stamp of an interaction, an identification of the point of sale, an identification of an individual interaction with the system and an identification of the cup.

In preferred embodiments, carriers may interact with an interaction point which may be provided by RFID readers at a system hub.

In preferred embodiments, the signals representative of the factors are dispatched to a cloud-based application where the remote processing module resides and where a profile of various interactions is progressively built up. The point of sale devices may also provide information with respect to its location, the time and date of purchase, the kind of beverage, and the quantity of beverage. The input obtained from the point of sale device may also feed into the remote processing module which would aggregate the data to determine a profile for one or more of the following: an individual cup, and a point of sale.

Furthermore, the remote processing module may obtain information feeds from the location of a carrier which may also be associated with a number of cups in need of cleaning and further processing. In this context, the module may be adapted or configured to calculate the distance between a point of initial interaction such as at the point of sale device and the recorded location of the carrier. This would allow the return events to be monitored and analysed. This may for example allow push notifications to be sent with appropriate notifications with potential awards for having returned the cup or alternatively notifications with the dispatch of a penalty charge notice for non-returns. This would also allow more accurate promotional and marketing activities to be developed.

FIG. 29 shows a preferred system structure with an HTTP REST API which is an application program interface using HTTP requests to get, put, post and delete data. A two-way communication interface allowing upload and download to a database is envisaged. An administration web-based user interface is provided. In addition, the system provides user and customer-facing web and mobile applications.

Primary and secondary interaction points are provided respectively with a first RFID scanner and a second RFID scanner. The first RFID scanner may be a hub scanner whereas the second RFID scanner may be a mobile scanner. Either a cup or a carrier may interact with either the first or the second RFID scanner. Alternatively, both the cup and the carrier may interact with either of the first and second RFID scanner. Embodiments of the invention envisage a network of RFID scanners forming a network of interaction points.

OTHER EMBODIMENTS

In further embodiments, a handling system may be configured to handle a plurality of food or beverage containers. The food or beverage containers may comprise a base, a walled portion upwardly extending from the base; and a lid for attachment to the walled portion; wherein the container comprises one or more remotely interrogatable tags integrated with one or more of the base, the upwardly extending walled portion, and the lid. In a preferred embodiment, the container comprises a tag located within its base.

Optionally, the container comprises a remotely interrogatable tag integrated within its lid.

Optionally, the tag comprises a disc which is secured to the container to prevent its removal. This may preferably include a welding junction between the tag and the container or another permanent fastener.

Optionally, the tag comprises a disc with a threaded perimeter, and the container comprises a recessed portion with a correspondingly threaded diameter; whereby the disc may be releasably secured to the container. Preferably, the disc comprises an outer surface with a recessed portion suitable for receiving a correspondingly shaped driver for driving the rotation of the disc when securing the disc to the container.

Preferably, the container's lid has an outer surface and an inner surface which comprises a recessed portion for releasably securing the further remotely interrogatable tag to the lid. Preferably, the carrier comprises a remotely interrogatable tag for identifying the carrier; and at least one compartment for receiving lids and at least a second compartment for receiving a container; said second compartment being segregated from the first compartment and having upwardly extending walls for facilitating the stacking of the containers in a closely contiguous configuration.

Optionally, the carrier comprises at least one parallelepipedal case. Preferably, the carrier comprises a plurality of stacked parallelepipedal cases.

Preferably, the carrier comprises one or more beams which act as a junction member between adjacent stacked cases.

Preferably, the carrier comprises a lid with at least two kinds of apertures; a first kind of aperture being sized and shaped to allow the insertion of a container and a second kind of aperture being sized and shaped to allow the insertion of a lid and prevent the insertion of a container.

Preferably, the first aperture is substantially circular and comprises one or more projections projecting radially inwards.

Preferably, the first aperture comprises diametrically oppositely disposed projections.

A further embodiment envisages, a handling system comprising a plurality of container in accordance with any one of the preceding aspects, a remote processing module and a plurality of remotely disposed interaction points which provide one or more of the following factors: a date and time stamp of an interaction, an identification of the point, an identification of an individual interacting with the system and an identification of the container; and which dispatch signals representative of the factors to the remote processing module.

Optionally, at least one of the remotely disposed interaction points collates one or more of the following additional factors: the location of the point of sale, the time of sale, the kind of beverage/food, and the quantity of beverage/food.

Optionally, the remote processing module aggregates the data to determine a profile for one or more of the following: an individual, a container, and a point of sale.

Optionally, the system further comprises an interaction point for providing a date and time stamp of an interaction, and an identification of a carrier in accordance with any one of the preceding claims.

Optionally, the system further comprises a location of a carrier; and a module for calculating the distance between a point of initial interaction with the container and a location of the carrier.

What is claimed is:

1. A handling system suitable for interaction with both a plurality of containers suitable for carrying hot beverages and a plurality of carriers suitable for carrying a plurality of containers; said plurality of containers comprising a base; a walled portion upwardly extending from said base; and a lid for attachment to said walled portion; each one of said plurality of carriers comprising at least one compartment for receiving said plurality of containers on top of each other; said plurality of carriers having a walled portion allowing a location of a carrier lid;
wherein each one of said containers of said plurality of containers and each one of said carriers of said plurality of carriers comprises one remotely interrogatable radio tag for respectively individually identifying each said container of said plurality of containers and each said carrier of said plurality of carriers; said remotely interrogatable radio tags being passive tags;
wherein said system further comprises:
a remote processing module configured to reside in a cloud based application executing on a server; and
a plurality of points of interaction where said remotely interrogatable radio tags interact with said system;
said plurality of points of interaction providing each one of the following factors:
a date and time stamp of an interaction;
an identification of the point;
an identification of an individual interacting with the system; and
an identification of at least one of the container of the plurality of containers and the carrier of said plurality of containers which interacts with said system;
wherein said system comprises a communication link for dispatching signals representative of said factors to said remote processing module; said remote processing module identifying an initial point of sale of said containers and subsequent interactions of said containers or said carriers at a different location; said different location comprising a cleaning station; and
said system further comprises at least one radio frequency (RF) scanner at said initial point of sale for scanning said remotely interrogatable radio tags; and at least one of a mobile RF scanner and a depot RF scanner at said different location for scanning said remotely interrogatable radio tags; said subsequent interactions being performed by one of said mobile RF scanner and said depot RF scanner and communicated to said remote processing module via the communication link; whereby a location of an individual container of said plurality of containers may be recorded between the initial point of sale and the cleaning station.

2. The handling system according to claim 1, wherein said remotely interrogatable radio tag of each one of said containers of said plurality of containers is integrated with at least one of: said base, said upwardly extending walled portion, and said lid.

3. The handling system according to claim 1, wherein said remotely interrogatable radio tag of each one of said containers of said plurality of containers is located within said base.

4. The handling system according to claim 1, wherein said remotely interrogatable radio tag of each one of said containers of said plurality of containers is integrated within said lid.

5. The handling system according to claim 1, wherein said remotely interrogatable radio tags are respectively embedded within the moulded plastics of each one of said container of the plurality of containers and said carrier of the plurality of carriers.

6. The handling system according to claim 1, wherein said lid of each one of said plurality of containers has an outer surface and an inner surface; said inner surface comprising a recessed portion for securing one remotely interrogatable radio tag of said plurality of remotely interrogatable radio tags to said lid.

7. The handling system according to claim 1, wherein said container of said plurality of containers comprises an annular band which extends at least partly around the upwardly extending walled portion and protrudes therefrom.

8. The handling system according to claim 1, wherein said lid incorporates a rim with an aperture through which beverage may, in use, exit said container of the plurality of containers and a part-spherical recessed portion located within said rim; a through hole being located in said part-spherical recessed portion.

9. The handling system according to claim 1, wherein said carrier of the plurality of carriers comprises at least one compartment for receiving lids and at least a second compartment for receiving containers; said second compartment being segregated from said first compartment and having upwardly extending walls for facilitating the stacking of said containers in a closely contiguous configuration.

10. The handling system according to claim 1, wherein said carrier of the plurality of carriers comprises at least one parallelepipedal case.

11. The handling system according to claim 10, wherein said carrier of the plurality of carriers comprises a plurality of stacked parallelepipedal cases.

12. The handling system according to claim 10, wherein said carrier of the plurality of carriers comprises at least one beam which act as a junction member between adjacent stacked cases.

13. The handling system according to claim 1, wherein said carrier of the plurality of carriers comprises a lid with at least two kinds of apertures; a first kind of aperture being sized and shaped to allow the insertion of each of said container of said plurality of containers and a second kind of aperture being sized and shaped to allow the insertion of a lid and prevent the insertion of each of said container of said plurality of containers.

14. The handling system according to claim 13, wherein said first aperture is substantially circular and comprises at least one projection projecting radially inwards.

15. The handling system according to claim 14, wherein said first aperture comprises diametrically oppositely disposed projections.

16. The handling system according to claim 1, wherein at least one of the interaction points collates at least one of the following additional factors: a location of the initial point of sale, a time of sale, a kind of beverage, and a quantity of beverage.

17. The handling system according to claim 1, wherein the remote processing module aggregates the data to determine a profile for at least one of the following: the individual interacting with the system, the container of said plurality of containers, and said initial point of sale.

18. The handling system according to claim 1, wherein the system further comprises a location of the carrier of the plurality of carriers; and said remote processing module calculates a distance between the point of initial interaction with the container of the plurality of containers and the location of the carrier of the plurality of carriers.

19. A handling system suitable for interaction with both a plurality of containers suitable for carrying hot beverages and a plurality of carriers suitable for carrying a plurality of containers; said plurality of containers comprising a base; a walled portion upwardly extending from said base; and a lid for attachment to said walled portion; each one of said plurality of carriers comprising at least one compartment for receiving said plurality of containers on top of each other; said plurality of carriers having a walled portion allowing a location of a carrier lid;

wherein each one of said containers of said plurality of containers and each one of said carriers of said plurality of carriers comprises one RFID tag for respectively individually identifying each said container of said plurality of containers and each said carrier of said plurality of carriers; said RFID tags being passive tags;

wherein said system further comprises:
a server; and
a plurality of points of interaction where said RFID tags interact with said system;
said plurality of points of interaction providing each one of the following factors:
a date and time stamp of an interaction;
an identification of the point;
an identification of an individual interacting with the system; and
an identification of at least one of the container of the plurality of containers and the carrier of said plurality of containers which interacts with said system;
wherein said system comprises a communication link for dispatching signals representative of said factors to the server; the server identifying an initial point of sale of said containers and subsequent interactions of said containers or said carriers at a different location; said different location comprising a cleaning station; and said system further comprises at least one radio frequency (RF) scanner at said initial point of sale for scanning said RFID tags; and at least one of a mobile RF scanner and a depot RF scanner at said different location for scanning said RFID tags; said subsequent interactions being performed by one of said mobile RF scanner and said depot RF scanner and communicated to said server via the communication link; whereby a location of an individual container of said plurality of containers may be recorded between the initial point of sale and the cleaning station.

* * * * *